United States Patent
Nogawa

(10) Patent No.: US 9,307,574 B2
(45) Date of Patent: *Apr. 5, 2016

(54) WIRELESS COMMUNICATION SYSTEM AND WIRELESS COMMUNICATION APPARATUS

(71) Applicant: Brother Kogyo Kabushiki Kaisha, Nagoya-shi, Aichi-ken (JP)

(72) Inventor: Hideki Nogawa, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 218 days.

This patent is subject to a terminal disclaimer.

(21) Appl. No.: 14/200,845

(22) Filed: Mar. 7, 2014

(65) Prior Publication Data

US 2014/0280661 A1    Sep. 18, 2014

(30) Foreign Application Priority Data

Mar. 18, 2013 (JP) ................ 2013-054738

(51) Int. Cl.
| | |
|---|---|
| H04W 84/04 | (2009.01) |
| H04W 8/00 | (2009.01) |
| H04W 84/12 | (2009.01) |
| H04W 84/20 | (2009.01) |

(52) U.S. Cl.
CPC .............. *H04W 84/12* (2013.01); *H04W 8/005* (2013.01); *H04W 84/20* (2013.01)

(58) Field of Classification Search
CPC ...... H04W 84/12; H04W 8/005; H04W 84/20
See application file for complete search history.

(56) References Cited

U.S. PATENT DOCUMENTS

| | | | | |
|---|---|---|---|---|
| 6,026,303 | A * | 2/2000 | Minamisawa | H04W 84/20 455/446 |
| 8,819,247 | B2 * | 8/2014 | Hymel | H04L 67/04 709/227 |
| 2002/0032025 | A1 | 3/2002 | Maeshima et al. | |
| 2004/0203373 | A1 * | 10/2004 | Ogino | H04W 84/20 455/41.2 |
| 2004/0203936 | A1 * | 10/2004 | Ogino | H04M 1/72513 455/463 |
| 2007/0045424 | A1 * | 3/2007 | Wang | H04W 84/18 235/462.46 |
| 2007/0106894 | A1 * | 5/2007 | Zhang | H04L 9/32 713/170 |
| 2008/0101330 | A1 * | 5/2008 | Cheng | H04W 24/02 370/350 |
| 2009/0092060 | A1 * | 4/2009 | Goto | H04L 63/0428 370/254 |
| 2010/0046468 | A1 * | 2/2010 | Oi | H04W 84/20 370/331 |

(Continued)

FOREIGN PATENT DOCUMENTS

| | | |
|---|---|---|
| JP | H10-145276 A | 5/1998 |
| JP | 2002-223217 A | 8/2002 |
| WO | 2005-034434 A1 | 4/2005 |

*Primary Examiner* — Joe Chacko
(74) *Attorney, Agent, or Firm* — Banner & Witcoff, Ltd.

(57) ABSTRACT

There is provided a wireless communication system including a first wireless communication apparatus and a second wireless communication apparatus. In a specific case, the first wireless communication apparatus changes a state from a first state of being a master station of a first wireless network to a second state of being a slave station of a second wireless network in which the second wireless communication apparatus is a master station, and transmits target data to the second wireless communication apparatus using the second wireless network in which the first wireless communication apparatus is the slave station and the second wireless communication apparatus is the master station. The second wireless communication apparatus receives the target data from the first wireless communication apparatus using the second wireless network.

11 Claims, 7 Drawing Sheets

(56) References Cited

U.S. PATENT DOCUMENTS

2010/0272083 A1* 10/2010 Itoh ...................... H04W 24/02 370/338
2012/0244902 A1* 9/2012 Saito ..................... H04W 84/20 455/517
2012/0254022 A1* 10/2012 Kimura ................. H04W 84/20 705/39
2012/0322498 A1* 12/2012 Nogawa .............. H04W 76/068 455/525
2014/0192792 A1* 7/2014 Huang .................. H04W 48/20 370/338

* cited by examiner (CASE OF FAX RECEPTION)

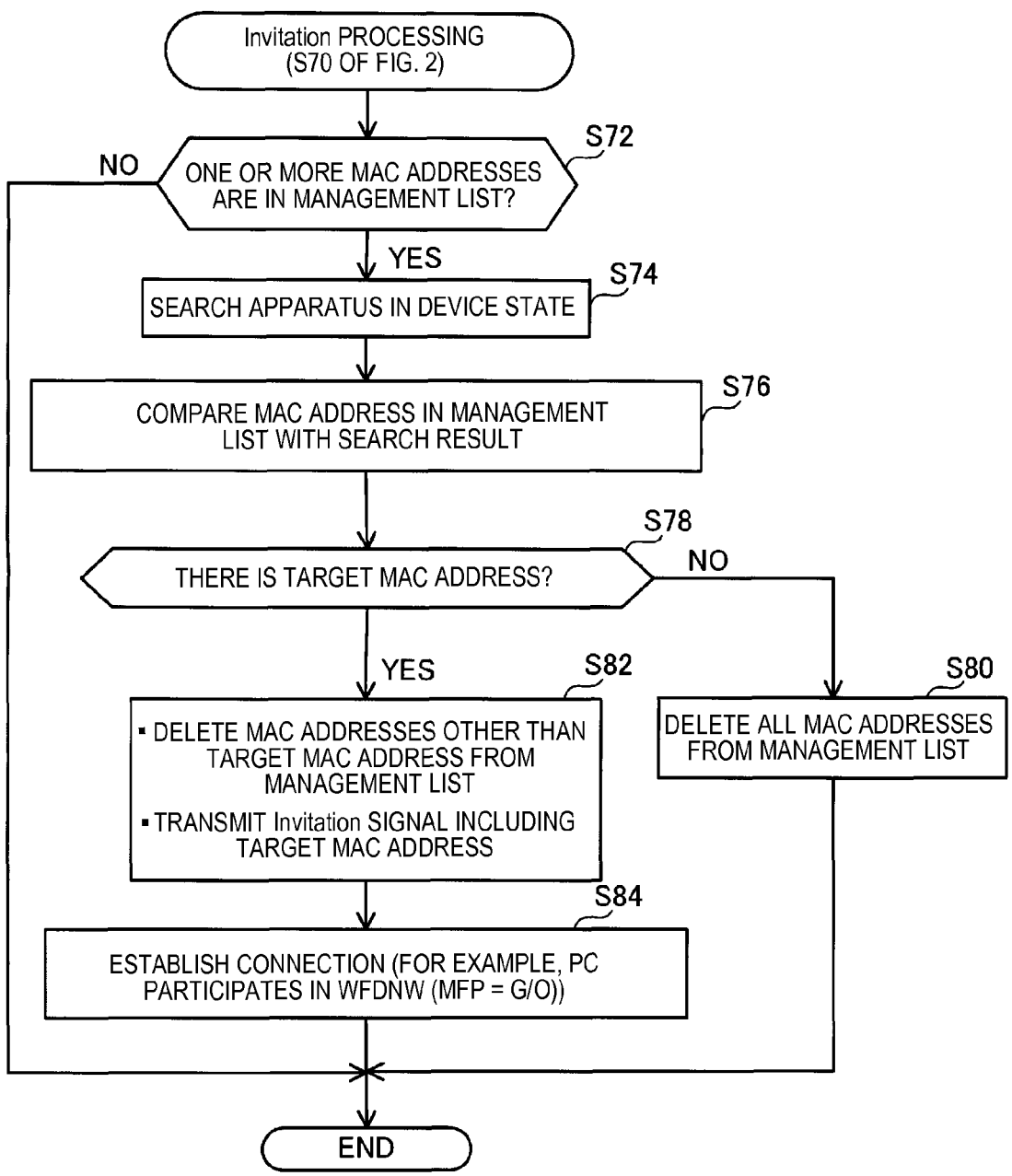

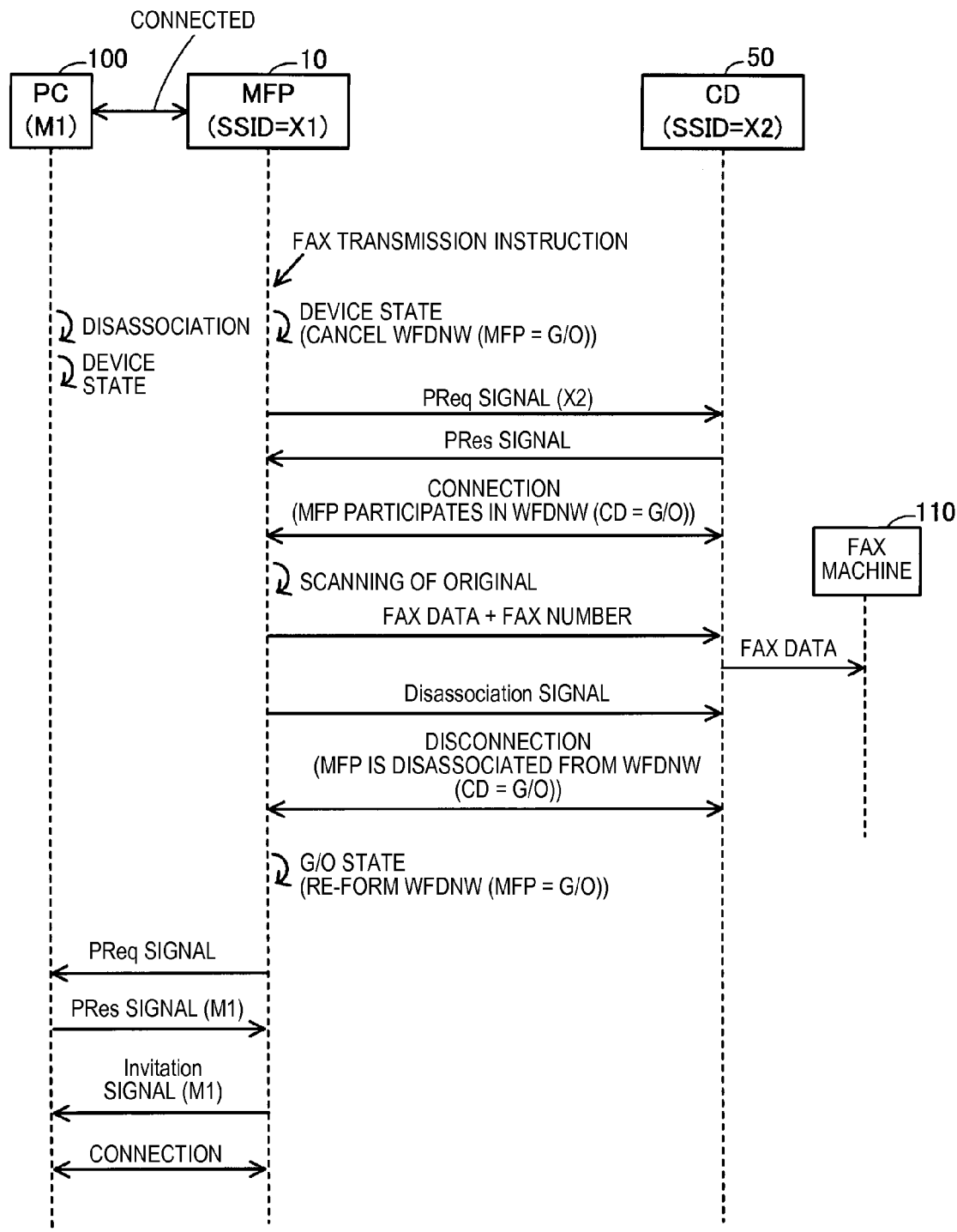

WIRELESS COMMUNICATION SYSTEM AND WIRELESS COMMUNICATION APPARATUS

CROSS-REFERENCE TO RELATED APPLICATION

This application claims priority from Japanese Patent Application No. 2013-054738, filed on Mar. 18, 2013, the entire subject matter of which is incorporated herein by reference.

TECHNICAL FIELD

This disclosure relates to a technique for performing wireless communication of target data between first and second wireless communication apparatuses.

BACKGROUND

There has been known various techniques in which a pair of wireless communication apparatuses execute wireless communication (refer to, JP-A-2002-223217, WO2005/034434 and JP-A-10-145276). For example, in an infrastructure wireless communication, a pair of wireless communication apparatuses execute wireless communication through an access point. Further, for example, in an ad hoc wireless communication, a pair of wireless communication apparatuses execute wireless communication without passing through an access point.

SUMMARY

This disclosure provides a technique in which the first and second wireless communication apparatuses execute wireless communication of target data using a non-conventional method.

According to an aspect of this disclosure, there is provided a wireless communication system including a first wireless communication apparatus, and a second wireless communication apparatus. The first wireless communication apparatus includes a first control device configured to: in a situation where a first wireless network in which the first wireless communication apparatus is a master station and a second wireless network in which the second wireless communication apparatus is a master station are formed, change a state of the first wireless communication apparatus from a first state to a second state in a specific case where transmission of target data is to be executed from the first wireless communication apparatus to the second wireless communication apparatus, the first state being a state in which the first wireless communication apparatus is the master station of the first wireless network, the second state being a state in which the first wireless communication apparatus is a slave station of the second wireless network, and in the specific case, transmit the target data to the second wireless communication apparatus using the second wireless network in which the first wireless communication apparatus is the slave station and the second wireless communication apparatus is the master station. The second wireless communication apparatus includes a second control device configured to, in the specific case, receive the target data from the first wireless communication apparatus using the second wireless network in which the first wireless communication apparatus is the slave station and the second wireless communication apparatus is the master station.

In this configuration, a situation is assumed where the first wireless network in which the first wireless communication apparatus is the master station and the second wireless network in which the second wireless communication apparatus is the master station are formed. In this situation, the first wireless communication apparatus is changed from the first state in which the first wireless communication apparatus is the master station of the first wireless network to the second state in which the first wireless communication apparatus is the slave station of the second wireless network in the specific case where the transmission of the target data from the first wireless communication apparatus to the second wireless communication apparatus is to be executed. Accordingly, the first wireless communication apparatus belongs to the second wireless network, in which the second wireless communication apparatus is the master station, as the slave station. Accordingly, the first wireless communication apparatus can appropriately transmit the target data to the second wireless communication apparatus using the second wireless network. The second wireless communication apparatus can appropriately receive the target data from the first wireless communication apparatus using the second wireless network.

Incidentally, the first wireless communication apparatus itself which is included in the above-described wireless communication system is also new and useful. The second wireless communication apparatus itself which is included in the above-described wireless communication system is also new and useful. A control method for realizing each of the first and second wireless communication apparatuses, a computer program, and a non-transitory computer-readable recording medium which stores the computer program are also new and useful.

BRIEF DESCRIPTION OF THE DRAWINGS

The above and other aspects of this disclosure will become more apparent and more readily appreciated from the following description taken in conjunction with the attached drawings, in which:

FIG. 6 is a flowchart of Invitation processing of an MFP; and

FIG. 7 is a sequence diagram according to a second illustrative embodiment.

DETAILED DESCRIPTION

First Illustrative Embodiment (Configuration of Wireless Communication System 2)

Figure 1:
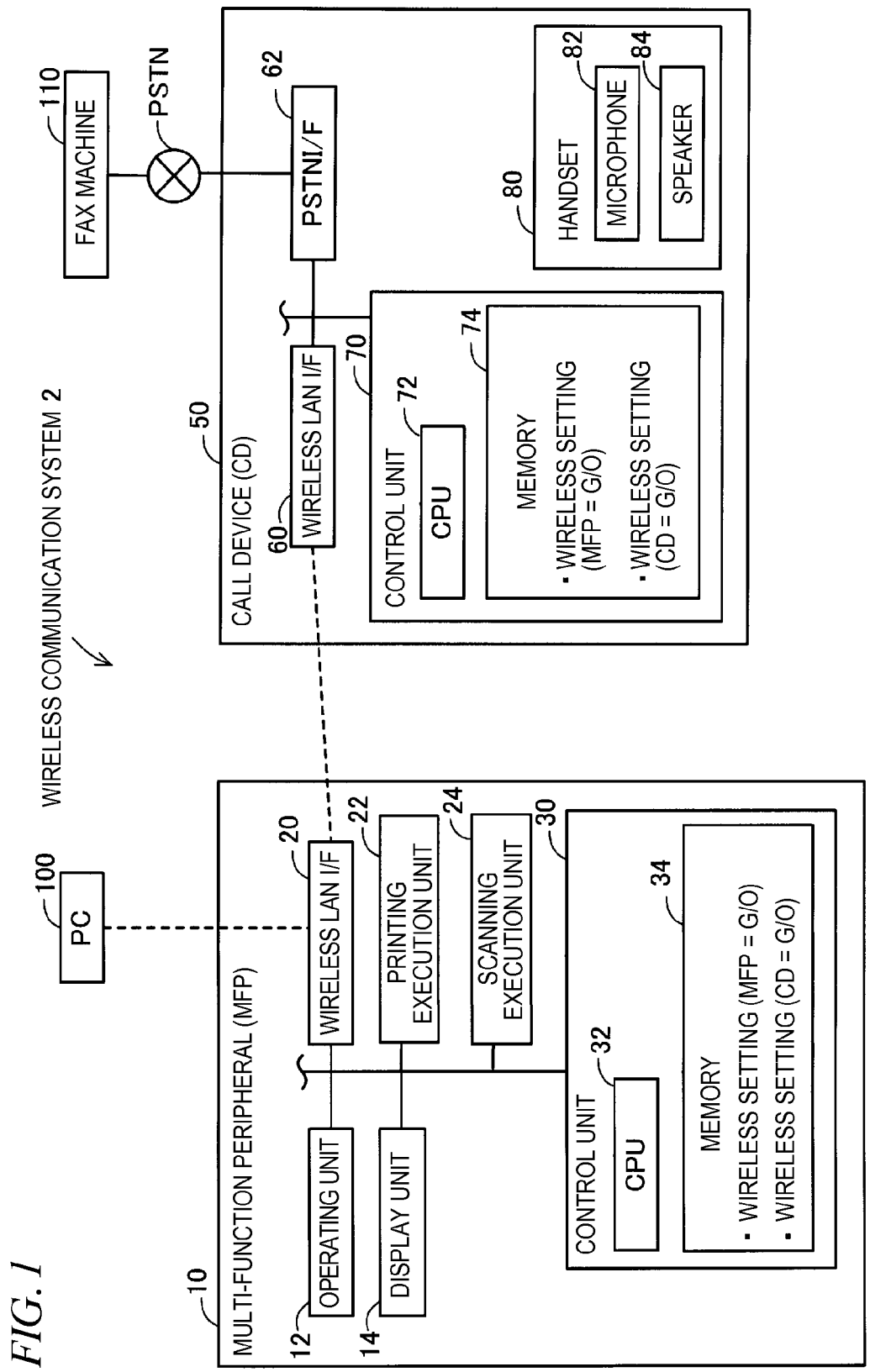
FIG. 1 shows a configuration of a communication system.

As shown in FIG. 1, the wireless communication system 2 includes a multi-function peripheral (MFP) 10, a call device (CD) 50, a personal computer (PC) 100, and a Facsimile (FAX) machine 110. The MFP 10 and the CD 50 can execute wireless communication of various kinds of data (for example, FAX data). The MFP 10 and the PC 100 can execute wireless communication of various kinds of data (for example, print data). The CD 50 and the FAX machine 110 can execute communication of FAX data through (via) a Public Switched Telephone Network (PSTN).

(Configuration of MFP 10)

The MFP 10 is a peripheral device (of the PC 100 or the like) which can execute multiple functions including a printing function and a scanning function. The MFP 10 includes an operation unit 12, a display unit 14, a wireless local area network (LAN) interface (I/F) 20, a printing execution unit 22, a scanning execution unit 24, and a control unit 30. The respective units 12 to 30 are connected to a bus line (reference numeral is omitted).

The operation unit 12 includes a plurality of keys. The user operates the operation unit 12, thereby inputting various instructions to the MFP 10. The display unit 14 is a display which displays various kinds of information. The wireless LAN I/F 20 is an I/F which executes wireless communication. The printing execution unit 22 includes an ink jet or laser printing mechanism. The scanning execution unit 24 includes a scanning mechanism, such as a CCD or a CIS.

The control unit 30 includes a CPU 32 and a memory 34. The CPU 32 executes various kinds of processing in accordance with a program stored in the memory 34. The memory 34 may be configured by a volatile memory, a non-volatile memory, a hard disk, or the like. The memory 34 stores wireless settings (described below) as well as the programs.

(Configuration of CD 50)

The CD 50 includes a wireless LAN I/F 60, a PSTN I/F 62, a control unit 70, and a handset 80. The respective units 60 to 70 are connected to a bus line (reference numeral is omitted). The respective units 60 to 70 are provided in a housing (not shown). The handset 80 is removably put on the housing.

The wireless LAN I/F 60 is an I/F which executes wireless communication. The PSTN I/F 62 is connected to a PSTN which is a general public network. Specifically, one end of a cable for the PSTN is connected to the PSTN I/F 62, and the other end of the cable is connected to, for example, a PSTN socket at home.

The control unit 70 includes a CPU 72 and a memory 74. The CPU 72 executes various kinds of processing in accordance with a program stored in the memory 74. The memory 74 is configured by a volatile memory, a non-volatile memory, a hard disk, or the like. The memory 74 stores wireless settings (described below) as well as the programs.

The handset 80 includes a microphone 82, a speaker 84, and a CPU (not shown). Although not shown, each of the housings of the handset 80 and the CD 50 includes an interface which executes wireless communication of sound data in accordance with the standard of Digital Enhanced Cordless Telecommunication (DECT). A user can execute telephone communication with a telephone (that is, a telephone connected to the PSTN) (not shown) through the housing (that is, the PSTN I/F 62) using the handset 80 in a state where the handset 80 is separated from the housing.

(FAX Function)

The MFP 10 and the CD 50 cooperatively execute processing to perform a FAX function. For example, if FAX data is received from the FAX machine 110 through the PSTN I/F 62, the CD 50 transmits FAX data to the MFP 10 through the wireless LAN I/F 60. If FAX data is received from the CD 50 through the wireless LAN I/F 20, the MFP 10 causes the printing execution unit 22 to print an image represented by FAX data. Accordingly, a FAX reception operation is performed.

Further, if the FAX machine 110 is designated as a transmission destination of FAX data, the MFP 10 transmits FAX data obtained by scanning an original to the CD 50 through the wireless LAN I/F 20. If FAX data is received from the MFP 10 through the wireless LAN I/F 60, the CD 50 transmits FAX data to the FAX machine 110 through the PSTN I/F 62. Accordingly, a FAX transmission operation is performed.

As described above, while the MFP 10 includes a function (that is, the printing execution unit 22) of printing an image represented by FAX data received from the PSTN, the CD 50 does not include this function. While the MFP 10 includes a function (that is, the scanning execution unit 24) of scanning the original to generate FAX data to be transmitted to the PSTN, the CD 50 does not include this function. Accordingly, the overall size of the MFP 10 is larger than the overall size of the CD 50.

If it is employed a system in which the cable for the PSTN should be connected to the MFP 10, instead of the CD 50 (that is, the PSTN I/F is provided in the MFP 10), user convenience might be deteriorated for the following reason. That is, the position of the PSTN socket at home is determined in advance. Since the MFP 10 has comparatively large size, in an environment where there is a small space near the PSTN socket, it is difficult to install the MFP 10 near the PSTN socket. In this condition, the user may be able to install the MFP 10 at a position away from the PSTN socket using a long cable. However, since such long cable causes worse appearance, it is generally not desirable that the user uses such long cable.

In contrast, in this illustrative embodiment, the PSTN I/F 62 is provided in the CD 50 of comparatively small size. Accordingly, even in an environment where there is a small space near the PSTN socket, the CD 50 can be easily installed near the PSTN socket to connect the CD 50 to the PSTN. Since the MFP 10 and the CD 50 can execute wireless communication of FAX data, the user can freely install the MFP 10 at a position away from the PSTN socket.

(Configuration of Apparatuses 100 and 110)

The PC 100 includes an Operating System (OS) program. The PC 100 can execute wireless communication in accordance with a Wi-Fi Direct (WFD) system (described below). The FAX machine 110 can execute FAX communication through the PSTN.

(Wireless Communication System)

Next, a wireless communication system (that is, a Wi-Fi Direct (WFD) system and a normal Wi-Fi system) used in this illustrative embodiment will be described. Hereinafter, the WFD system and the normal Wi-Fi system will be described sequentially, and then, how the MFP 10 and the CD 50 use the respective systems will be described.

(WFD System)

The WFD system is a wireless communication system which is described in the standard "Wi-Fi Peer-to-Peer (P2P) Technical Specification Version 1.1" created by Wi-Fi Alliance. For example, the WFD system is a wireless communication system which executes wireless communication in accordance with the standard of IEEE (The Institute of Electrical and Electronics Engineers, Inc.) 802.11 and the equivalent standards (for example, 802.11a, 11b, 11g, 11n, and the like).

Hereinafter, an apparatus which can execute wireless communication according to the WFD system is referred to as "WFD-compatible apparatus". The standard of the WFD defines that the WFD-compatible apparatus has three states including a Group Owner state (hereinafter, referred to as "G/O state"), a client state (hereinafter, referred to as "CL state"), and a device state. The WFD-compatible apparatus can selectively operate in one state out of the three states.

When a pair of WFD-compatible apparatuses in the device state newly form a wireless network, the pair of WFD-compatible apparatuses normally execute wireless communication, normally referred to as G/O negotiation. In the G/O negotiation, one apparatus of the pair of WFD-compatible apparatuses is determined to become the G/O state (that is, a G/O apparatus) and forms a WFD network (hereinafter, referred to as "WFDNW"). The other apparatus is determined to become the CL state (that is, a CL apparatus) and participates in the WFDNW.

In a stage in which the WFDNW is newly formed by the G/O negotiation, only one G/O apparatus and one CL apparatus belong to the WFDNW. However, although details will be described below, the G/O apparatus allows other WFD-compatible apparatuses to newly participate in the WFDNW as a CL apparatus. In this case, two or more CL apparatuses belong to the WFDNW. That is, in the WFDNW, there are one G/O apparatus and one or more CL apparatuses. The G/O apparatus manages one or more CL apparatuses. Specifically, the G/O apparatus registers the MAC addresses of one or more CL apparatuses in a management list in a memory of the G/O apparatus. If a CL apparatus is diassociated from the WFDNW, the G/O apparatus deletes the MAC address of the CL apparatus from the management list. If the number of CL apparatuses becomes zero (that is, the number of MAC addresses registered in the management list becomes zero), normally, the G/O apparatus is transited from the G/O state to the device state and cancels the WFDNW.

The upper limit value (that is, the upper limit value of the number of MAC addresses of CL apparatuses which can be registered in the management list) of the number of CL apparatuses which can be managed by the G/O apparatus is determined in advance by the G/O apparatus. The upper limit value of the number of CL apparatuses which can be managed by the G/O apparatus may have any value insofar as the value is an integer equal to or greater than one.

The G/O apparatus can execute wireless communication of target data with CL apparatuses registered in the management list without passing through other apparatuses. The target data is data which includes information of a network layer of an OSI reference model and information of a layer (for example, an application layer) higher than the network layer, and includes, for example, FAX data. The G/O apparatus can relay wireless communication of target data between a pair of CL apparatuses. In other words, a pair of CL apparatuses can execute wireless communication of target data through the G/O apparatus.

As described above, in the WFDNW, it is possible to execute wireless communication of target data between a WFD-compatible apparatus as a transmission source of target data and a WFD-compatible apparatus as a transmission destination of target data without passing through an access point (hereinafter, referred to as "AP") configured separately from the WFD-compatible apparatuses. That is, the WFDNW is a wireless network in which no AP is used.

The difference between the WFD G/O apparatus and the AP is as follows. That is, if the WFD G/O apparatus is diassociated from the WFDNW to which the apparatus belongs and newly belongs to a different WFDNW, the WFD G/O apparatus can operate in a state (that is, the CL state) different from the G/O state. In contrast, the AP can execute only the same operation (for example, relay of wireless communication) as the WFD G/O state, and cannot execute the same operation of the WFD CL state.

Although the G/O apparatus cannot execute wireless communication of target data with the WFD-compatible apparatus (that is, a device apparatus) in the device state, the G/O apparatus can execute wireless communication of WFD connection data with the device apparatus. That is, the G/O apparatus executes wireless communication of WFD connection data with the device apparatus to establish connection with the device apparatus, thereby causing the device apparatus to participate in the WFDNW. In other words, the device apparatus executes wireless communication of WFD connection data with the G/O apparatus to establish connection with the G/O apparatus, thereby participating in the WFDNW. In this case, the device apparatus is transited from the device state to the CL state. The WFD connection data is data (that is, data including no information of the network layer) which includes information of a layer (for example, a physical layer or a data link layer) lower than the network layer of the OSI reference model, and includes, for example, a Probe Request signal, a Probe Response signal, a Provision Discovery Request signal, a Provision Discovery Response signal, an Authentication Request signal, an Authentication Response signal, an Association Request signal, an Association Response signal, a 4-Way Handshake signal, and the like.

The G/O apparatus further executes wireless communication of normal Wi-Fi connection data with a normal Wi-Fi apparatus to establish connection with the normal Wi-Fi apparatus, thereby causing the normal Wi-Fi apparatus to participate in the WFDNW. Although the normal Wi-Fi apparatus is an apparatus which is also referred to as "legacy apparatus", and cannot participate in the wireless network in accordance with the WFD system (for example, cannot execute the G/O negotiation), the normal Wi-Fi apparatus can participate in the wireless network in accordance with the normal Wi-Fi system. The normal Wi-Fi connection data is the same as the WFD connection data, except that no Provision Discovery Request signal and Provision Discovery Response signal are included.

When establishing connection with the normal Wi-Fi apparatus, the G/O apparatus describes the MAC address of the normal Wi-Fi apparatus in the management list. Accordingly, the normal Wi-Fi apparatus can participate in the WFDNW. Although the normal Wi-Fi apparatus does not selectively operate in one state out of the three states (that is, the G/O state, the CL state, and the device state) of the WFD system, the normal Wi-Fi apparatus operates in the same state as the CL apparatus while belonging to the WFDNW.

The WFD-compatible apparatus does not operate in any state out of the three states of the WFD system, and executes wireless communication of normal Wi-Fi connection data with the G/O apparatus to establish connection with the G/O apparatus, thereby participating in the WFDNW. That is, the WFD-compatible apparatus may execute the same operation as the normal Wi-Fi apparatus (that is, the legacy apparatus), thereby participating in the WFDNW. Hereinafter, when the WFD-compatible apparatus executes the same operation as the normal Wi-Fi apparatus (that is, the legacy apparatus) to participate in the WFDNW, this is referred to as "participation in the WFDNW as a legacy apparatus".

(Normal Wi-Fi)

The normal Wi-Fi system is a wireless communication system which is determined by Wi-Fi Alliance and is different from the WFD system. Similarly to the WFD system, the normal Wi-Fi system is a wireless communication system which executes wireless communication in accordance with the standard of IEEE 802.11 and the equivalent standards (for example, 802.11a, 11b, 11g, 11n, and the like). That is, the WFD system and the normal Wi-Fi system are the same from the viewpoint of the communication standard.

However, as described above, while the WFD system is a wireless communication system which executes wireless communication without passing through the AP, the normal Wi-Fi system is a wireless communication system which executes wireless communication through the AP. While the WFD system is a wireless communication system which has a mechanism of the G/O negotiation, the normal Wi-Fi system is a wireless communication system which does not have such mechanism. As described above, while the WFD connection data includes the Provision Discovery Request signal and the Provision Discovery Response signal, the normal Wi-Fi connection data does not include these signals. While the WFD system is a wireless communication system which permits a selective operation in one state out of the three states (that is, the G/O state, the CL state, and the device state), the normal Wi-Fi system is a wireless communication system which does not permit the selective operation. These points are different between the WFD system and the normal Wi-Fi system.

The normal Wi-Fi apparatus executes wireless communication of normal Wi-Fi connection data with the AP to establish connection with the AP. Accordingly, the normal Wi-Fi apparatus can participate in a wireless network (hereinafter, referred to as "normal Wi-FiNW") formed by the AP. In this process, the normal Wi-Fi apparatus does not execute the G/O negotiation and does not selectively determine operation in the G/O state or the CL state. The normal Wi-Fi apparatus can execute wireless communication of target data with other apparatus belonging to the normal Wi-FiNW, through the AP. If connection with the normal Wi-Fi apparatus is established, the AP describes the MAC address of the normal Wi-Fi apparatus in the management list of the AP.

As explained in the description of the WFD system, the normal Wi-Fi apparatus further executes wireless communication of normal Wi-Fi connection data with the G/O apparatus to establish connection with the G/O apparatus, thereby participating in the WFDNW.

(Overview of Operation of MFP 10 and CD 50)

Although described below in detail, the MFP 10 and the CD 50 can be voluntarily transited from the device state to the G/O state without executing the G/O negotiation. That is, if the MFP 10 is powered on, the MFP 10 is voluntarily transited to the G/O state to form a WFDNW (hereinafter, referred to as "WFDNW (MFP=G/O)") in which the MFP 10 is a G/O apparatus (S10 of FIG. 2). If the CD 50 is powered on, the CD 50 is voluntarily transited to the G/O state to form a WFDNW (hereinafter, referred to as "WFDNW (CD=G/O)") in which the CD 50 is a G/O apparatus (S110 of FIG. 3). Since the G/O apparatus (that is, the MFP 10) of the WFDNW (MFP=G/O) and the G/O apparatus (that is, the CD 50) of the WFDNW (CD=G/O) are different, the two WFDNWs are different networks.

The MFP 10 executes wireless communication of WFD connection data or normal Wi-Fi connection data with other apparatuses (for example, the CD 50 and the PC 100), thereby causing other apparatuses to participate in the WFDNW (MFP=G/O) as a CL apparatus. For example, after the WFDNW (CD=G/O) is cancelled, the MFP 10 executes wireless communication of normal Wi-Fi connection data with the CD 50, thereby causing the CD 50 to participate in the WFDNW (MFP=G/O) (S52 of FIG. 2). That is, the CD 50 can participate in the WFDNW (MFP=G/O) as a legacy apparatus (S128 of FIG. 3). Accordingly, the MFP 10 as a G/O apparatus and the CD 50 as a CL apparatus can execute wireless communication of target data (for example, FAX data) using the WFDNW (MFP=G/O) without passing through other apparatuses.

Similarly, the CD 50 executes wireless communication of WFD connection data or normal Wi-Fi connection data with other apparatuses (for example, the MFP 10), thereby causing the other apparatuses in the WFDNW (CD=G/O) as a CL apparatus. For example, after the WFDNW (MFP=G/O) is cancelled, the CD 50 executes wireless communication of normal Wi-Fi connection data with the MFP 10, thereby causing the MFP 10 to participate in the WFDNW (CD=G/O) (S152 of FIG. 3). That is, the MFP 10 can participate in the WFDNW (CD=G/O) as a legacy apparatus (S28 of FIG. 2). Accordingly, the CD 50 as a G/O apparatus and the MFP 10 as a CL apparatus can execute wireless communication of target data (for example, FAX data) using the WFDNW (CD=G/O) without passing through other apparatuses.

As described above, if the WFDNW is formed by the G/O negotiation, and the number of CL apparatuses becomes zero (that is, the number of MAC addresses registered in the management list becomes zero), the G/O apparatus is transited from the G/O state to the device state and cancels the WFDNW. However, like the MFP 10 and the CD 50, if the WFDNW is formed by the spontaneous transition to the G/O state, even if the number of CL apparatuses becomes zero, the WFDNW is not cancelled. For example, even if the CD 50 as a CL apparatus is disassociated from the WFDNW (MFP=G/O) and as a result, the number of CL apparatuses becomes zero, the WFDNW (MFP=G/O) to which only the MFP 10 as a G/O apparatus belongs is maintained by the MFP 10. For example, even if the MFP 10 as a CL apparatus is disassociated from the WFDNW (CD=G/O), and as a result, the number of CL apparatuses becomes zero, the WFDNW (CD=G/O) to which only the CD 50 as a G/O apparatus belongs is maintained by the CD 50.

As described above, each of the MFP 10 and the CD 50 can form the WFDNW using the WFD system and can participate in the WFDNW using the normal Wi-Fi system (that is, as legacy apparatus).

The memory 34 of the MFP 10 stores a wireless setting (hereinafter, referred to as "wireless setting (MFP=G/O)") which would be used in the WFDNW (MFP=G/O) and a wireless setting (hereinafter, referred to as "wireless setting (CL=G/O)") which would be used in the WFDNW (CD=G/O). Similarly, the memory 74 of the CD 50 also stores a wireless setting (MFP=G/O) and a wireless setting (CL=G/O). The wireless setting (MFP=G/O) and the wireless setting (CL=G/O) are respectively stored in the memories 34 and 74 in advance at shipment of the MFP 10 and the CD 50.

The wireless setting (MFP=G/O) includes a Service Set Identifier (SSID), a Basic Service Set Identifier (BSSID), an authentication system, an encryption system, and a password. The SSID and the BSSID included in the wireless setting (MFP=G/O) are a network identifier for identifying the WFDNW (MFP=G/O) and the MAC address of the MFP 10 as the G/O apparatus of the WFDNW (MFP=G/O), respectively. The authentication system, the encryption system, and the password are information for executing apparatus authentication, data encryption, and the like.

The wireless setting (CD=G/O) includes the similar information as the wireless setting (MFP=G/O). The SSID and the BSSID included in the wireless setting (CD=G/O) are a network identifier for identifying the WFDNW (CD=G/O) and the MAC address of the CD 50 as a G/O apparatus of the WFDNW (CD=G/O), respectively. The SSID and the BSSID included in the wireless setting (CD=G/O) are different from the SSID and the BSSID included in the wireless setting (MFP=G/O), respectively. The encryption system included in the wireless setting (CD=G/O) is AES.

Figure 2:
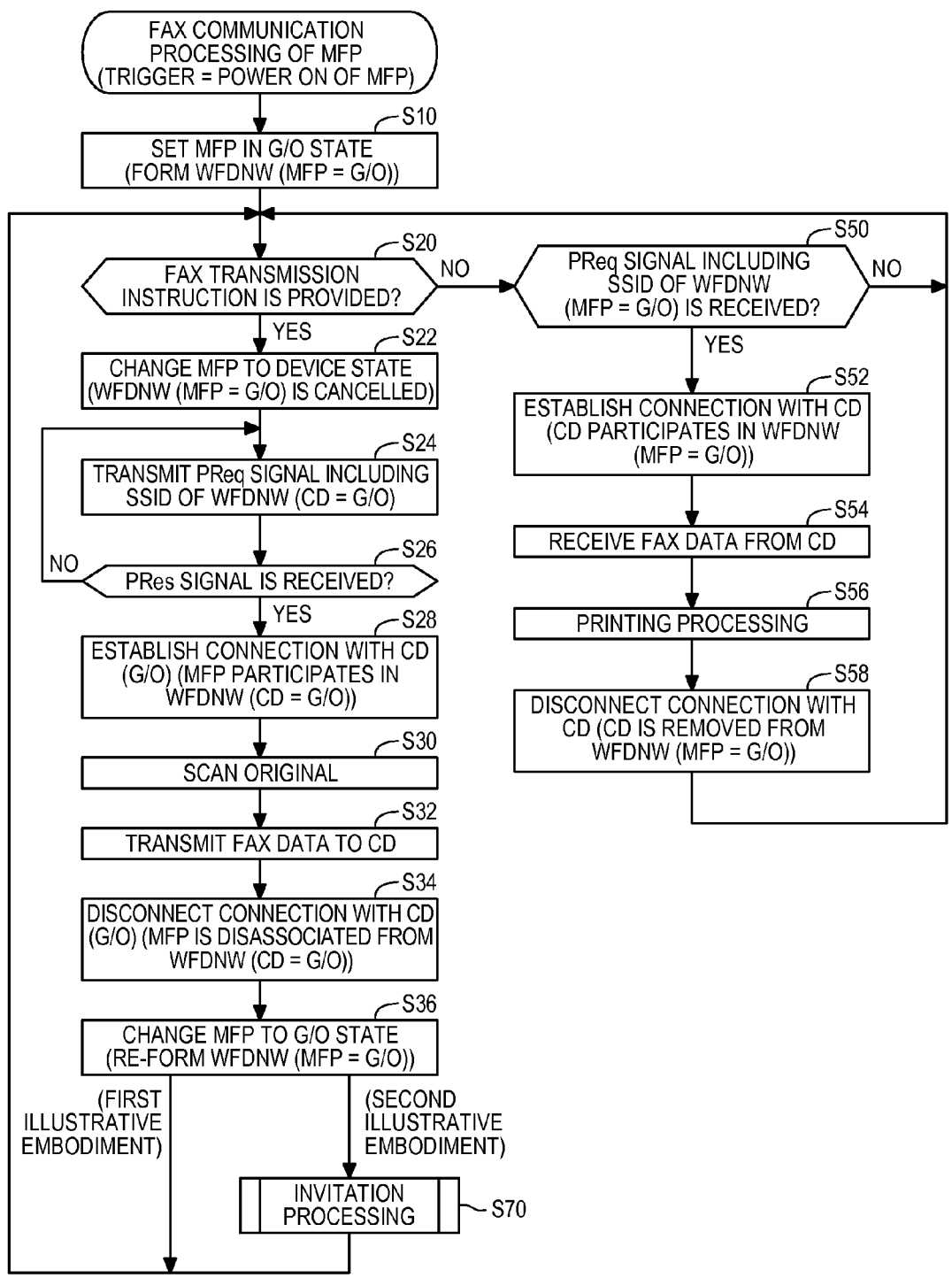
FIG. 2 is a flowchart of FAX communication processing of a multi-function peripheral (MFP)

(FAX Communication Processing Executed by CPU 32 of MFP 10; FIG. 2)

Subsequently, FAX communication processing which is executed by the CPU 32 of the MFP 10 will be described referring to FIG. 2. If the MFP 10 is powered on, the CPU 32 starts the processing of FIG. 2.

In S10, if the MFP 10 is powered on, the CPU 32 sets the state of the MFP 10 in the G/O state. That is, the CPU 32 voluntarily transits the state of the MFP 10 to the G/O state without executing the G/O negotiation. The CPU 32 generates a management list, in which the MAC address of an apparatus belonging to the WFDNW (MFP=G/O) would be described, in the memory 34. However, at present, the number of MAC addresses which are described in the management list is zero. If S10 is executed, the WFDNW (MFP=G/O) to which the MFP 10 as a G/O apparatus belongs is formed.

Next, the CPU 32 executes monitoring processing. The monitoring processing includes processing (S20) for monitoring whether an FAX transmission instruction is provided, and processing (S50) for monitoring whether a Probe Request signal including the SSID of the wireless setting (MFP=G/O) is received. In the drawings, the Probe Request signal and the Probe Response signal are respectively simply described as "PReq signal" and "PRes signal".

If the user wants to execute the transmission of FAX data to the FAX machine 110 (see FIG. 1), the user operates the operation unit 12 of the MFP 10 to input a FAX number of the FAX machine 110 and to press a FAX start button. In this case, the CPU 32 determines that the FAX transmission instruction is provided (YES in S20), and proceeds to S22.

In S22, the CPU 32 transits the state of the MFP 10 from the G/O state to the device state. The CPU 32 deletes the management list from the memory 34. Accordingly, the WFDNW (MFP=G/O) is cancelled. Therefore, if the PC 100 participates in the WFDNW (MFP=G/O) as a CL apparatus, since the WFDNW (MFP=G/O) is cancelled, the PC 100 is disassociated from the WFDNW (MFP=G/O) and is transited from the CL state to the device state.

As described above, if the CD 50 is powered on, the CPU 72 sets the state of the CD 50 in the G/O state to form the WFDNW (CD=G/O). In S24 to S28, the CPU 32 executes wireless communication of normal Wi-Fi connection data with the CD 50 to execute processing for participating in the WFDNW (CD=G/O). That is, the CPU 32 executes processing for participating in the WFDNW (CD=G/O) as a legacy apparatus.

Specifically, in S24, the CPU 32 reads the SSID (hereinafter, referred to as "SSID (CD=G/O)") included in the wireless setting (CD=G/O) from the memory 34, and transmits a Probe Request signal including the SSID (CD=G/O) through the wireless LAN I/F 20. The Probe Request signal further includes the MAC address of the MFP 10.

Although described below in detail, if the Probe Request signal including the SSID (CD=G/O) is received (YES in S150 of FIG. 3), the CD 50 transmits a Probe Response signal, which is a response signal to the Probe Request signal, to the MFP 10 (S152).

In S26, the CPU 32 determines whether the Probe Response signal is received from the CD 50 through the wireless LAN I/F 20. If the Probe Response signal is received from the CD 50, the CPU 32 determines to be YES in S26, and proceeds to S28. If the Probe Response signal is not received from the CD 50, the CPU 32 determines to be NO in S26, and transmits the Probe Request signal including the SSID (CD=G/O) again in S24.

Although not shown in FIG. 2, even if the processing (S24) for transmitting the Probe Request signal is executed a predetermined number of times, if the Probe Response signal is not received from the CD 50, the CPU 32 does not execute processing after S28 described below. For example, when the CD 50 is powered off, this situation may occur. In this case, the CPU 32 returns the state of the MFP 10 to the G/O state and forms the WFDNW (MFP=G/O) again.

In S28, the CPU 32 establishes connection with the CD 50. Specifically, the CPU 32 sequentially transmits an Authentication Request signal and an Association Request signal to the CD 50 through the wireless LAN I/F 20, and sequentially receives an Authentication Response signal and an Association Response signal from the CD 50 through the wireless LAN I/F 20. Thereafter, the CPU 32 executes communication of a 4-Way Handshake signal with the CD 50 through the wireless LAN I/F 20. The respective signals do not include a Provision Discovery Request signal and a Provision Discovery Response signal particular to WFD connection data. In the process of communication of the respective signals, the CPU 32 further transmits respective information (authentication system, encryption system, password, and the like) included in the wireless setting (CD=G/O) in the memory 34 to the CD 50.

Although described below in detail, if the wireless setting (CD=G/O) is received from the MFP 10, the CD 50 executes the authentication of the MFP 10 (S152 of FIG. 3). The wireless setting (CD=G/O) received by the CD 50 is a wireless setting which is used in the WFDNW (CD=G/O). Accordingly, the CD 50 determines that the authentication is successful. The CD 50 describes the MAC address (that is, the MAC address included in the Probe Request signal transmitted from the MFP 10 to the CD 50) of the MFP 10 in the management list in the memory 74.

If S28 is executed, the connection between the MFP 10 and the CD 50 is established. Accordingly, the MFP 10 can participate in the WFDNW (CD=G/O) as a legacy apparatus. At this time, the state of the MFP 10 may not be any state of the three states (that is, the G/O state, the CL state, and the device state) of the WFD system. In S28, the CPU 32 further receives the IP address of the MFP 10 and the IP address of the CD 50, which would be used in the WFDNW (CD=G/O), from the CD 50 through the wireless LAN I/F 20. Accordingly, the CPU 32 can execute wireless communication of FAX data (described below) using these IP addresses.

As described above, in S28, the MFP 10 participates in the WFDNW (CD=G/O) as a legacy apparatus, not as a CL apparatus. The reason will be described below. In this illustrative embodiment, insofar as predetermined operation (hereinafter, referred to as "WFD connection operation") for establishing the connection of the WFD system between the MFP 10 and other apparatuses is not executed on the operation unit 12 by the user, the CPU 32 cannot execute communication of WFD connection data (for example, the Provision Discovery Request signal and the Provision Discovery Response signal). Meanwhile, even if operation is not executed by the user, the CPU 32 can execute communication of normal Wi-Fi connection data. Therefore, in this illustrative embodiment, the CPU 32 executes communication of normal Wi-Fi connection data in a condition where WFD connection operation is not executed, that is, in the condition of S28, and participates in the WFDNW (CD=G/O) as a legacy apparatus.

In a modified illustrative embodiment, even if WFD connection operation is not operated on the operation unit 12 by the user, the CPU 32 may execute communication of WFD connection data. In this case, in S28, the CPU 32 may execute communication of WFD connection data with the CD 50 and may participate in the WFDNW (CD=G/O) as a CL apparatus. In this modified illustrative embodiment, the MFP 10 can also appropriately participate in the WFDNW (CD=G/O).

Next, in S30, the CPU 32 provides a scanning instruction to the scanning execution unit 24 to cause the scanning execution unit 24 to scan the original. Accordingly, scan data (that is, FAX data) representing the original is generated.

Subsequently, in S32, the CPU 32 transmits the generated FAX data and the FAX number of the FAX machine 110 to the CD 50 through the wireless LAN I/F 20. Specifically, the CPU 32 designates the received IP address of the MFP 10 as a transmission source IP address, further designates the received IP address of the CD 50 as a transmission destination IP address, and transmits the FAX data and the FAX number. Accordingly, the CPU 32 can transmit the FAX data and the FAX number to the CD 50 using the WFDNW (CD=G/O) without passing through other apparatuses.

Although described below in detail, if the FAX data and the FAX number are received from the MFP 10 (S154 of FIG. 3), the CD 50 transmits the FAX data to the FAX machine 110 through the PSTN (S156). Accordingly, the user can transmit the FAX data to the FAX machine 110.

If the transmission of the FAX data from the MFP 10 to the CD 50 is completed, the process proceeds to S34. In S34, the CPU 32 transmits a Disassociation signal for disassociation from the wireless network to the CD 50 through the wireless LAN I/F 20. Accordingly, the CPU 32 disconnects the connection with the CD 50. That is, the MFP 10 can be disassociated from the WFDNW (CD=G/O).

Next, in S36, the CPU 32 returns the state of the MFP 10 to the G/O state and re-forms the WFDNW (MFP=G/O). The CPU 32 generates a management list in the memory 34. The wireless setting (MFP=G/O) which is used in the WFDNW (MFP=G/O) re-formed in S36 is the same as the wireless setting (MFP=G/O) which is used in the WFDNW (MFP=G/O) formed in S10. If S36 ends, the process returns to S20.

Subsequently, a condition where it is determined to be YES in the monitoring processing of S50 will be described. Although described below in detail, if the FAX data is received from the PSTN (YES in S120 of FIG. 3), the CD 50 is transited from the G/O state to the device state (S122), and transmits the PReq signal including the SSID (hereinafter, referred to as "SSID (MFP=G/O)") of the wireless setting (MFP=G/O) (S124).

If the Probe Request signal including the SSID (MFP=G/O) is received from the CD 50 through the wireless LAN I/F 20, the CPU 32 of the MFP 10 determines to be YES in S50 and proceeds to S52. The Probe Request signal further includes the MAC address of the CD 50.

In S52, the CPU 32 establishes the connection with the CD 50. Specifically, the CPU 32 first transmits the Probe Response signal to the CD 50 through the wireless LAN I/F 20. Next, the CPU 32 sequentially receives the Authentication Request signal and the Association Request signal from the CD 50 through the wireless LAN I/F 20 and sequentially transmits the Authentication Response signal and the Association Response signal to the CD 50 through the wireless LAN I/F 20. Thereafter, the CPU 32 executes communication of the 4-Way Handshake signal with the CD 50 through the wireless LAN I/F 20. The respective signals do not include the Provision Discovery Request signal and the Provision Discovery Response signal particular to WFD connection data. In the process of communication of the respective signals, the CPU 32 further receives the respective information (authentication system, encryption system, password, and the like) included in the wireless setting (MFP=G/O) from the CD 50.

If the wireless setting (MFP=G/O) is received from the CD 50, the CPU 32 executes the authentication of the CD 50. The wireless setting (MFP=G/O) received in S52 is a wireless setting which is used in the WFDNW (MFP=G/O). Accordingly, the CPU 32 determines that authentication is successful. The CPU 32 describes the MAC address (that is, the MAC address included in the Probe Request signal transmitted from the CD 50 to the MFP 10) of the CD 50 in the management list in the memory 34.

If S52 is executed, connection is established between the MFP 10 and the CD 50. Accordingly, the CD 50 can participate in the WFDNW (MFP=G/O) as a legacy apparatus. That is, the CPU 32 can cause the CD 50 to participate in the WFDNW (MFP=G/O) as a legacy apparatus. In S52, the CPU 32 further transmits the IP address of the MFP 10 and the IP address of the CD 50, which would be used in the WFDNW (MFP=G/O), to the CD 50 through the wireless LAN I/F 20.

Next, in S54, the CPU 32 receives the FAX data from the CD 50 through the wireless LAN I/F 20.

Subsequently, in S56, the CPU 32 provides the received FAX data to the printing execution unit 22. Accordingly, the printing execution unit 22 prints an image represented by the received FAX data on a printing medium, and the user can acquire the printed medium.

Next, in S58, the CPU 32 receives the Disassociation signal from the CD 50 through the wireless LAN I/F 20. Accordingly, the CPU 32 disconnects the connection with the CD 50. The CPU 32 deletes the MAC address of the CD 50 from the management list in the memory 34. As a result, the CD 50 is disassociated from the WFDNW (CD=G/O). If S58 ends, the process returns to S20.

(FAX Communication Processing Executed by CPU 72 of CD 50; FIG. 3)

Subsequently, FAX communication processing which is executed by the CPU 72 of the CD 50 will be described referring to FIG. 3. If the CD 50 is powered on, the CPU 72 starts processing of FIG. 3.

In S110, if the CD 50 is powered on, the CPU 72 sets the state of the CD 50 in the G/O state and further generates a management list in the memory 74. If S110 is executed, the WFDNW (CD=G/O) to which only the CD 50 as a G/O apparatus belongs is formed.

Next, the CPU 72 executes monitoring processing. The monitoring processing includes processing (S120) for monitoring whether FAX data is received from the PSTN and processing (S150) for monitoring whether the Probe Request signal including the SSID (CD=G/O) is received.

If FAX data is received from the FAX machine 110 through the PSTN I/F 62, the CPU 72 determines to be YES in S120 and proceeds to S122. S122 to S128 are similar to S22 to S28 of FIG. 2, except that the execution entity is the CPU 72 and information to be used is different. Accordingly, hereinafter, the details of S122 to S128 will be described without describing the same points as S22 to S28 of FIG. 2.

In S122, the CPU 72 transits the state of the CD 50 from the G/O state to the device state. Accordingly, the WFDNW (CD=G/O) is cancelled.

Next, in S124 to S128, the CPU 72 executes processing for executing wireless communication of normal Wi-Fi connection data with the MFP 10 and participating in the WFDNW (MFP=G/O). That is, the CPU 72 executes processing for participating in the WFDNW (MFP=G/O) as a legacy apparatus.

Specifically, in S124, the CPU 72 reads the SSID (MFP=G/O) included in the wireless setting (MFP=G/O) from the memory 34 and transmits the Probe Request signal including the SSID (MFP=G/O) through the wireless LAN I/F 60. The Probe Request signal further includes the MAC address of the CD 50.

As described above, if the Probe Request signal is received from the CD 50, the MFP 10 transmits the Probe Response signal to the CD 50 (S52 of FIG. 2). In S126, the CPU 72 determines whether the Probe Response signal is received from the MFP 10 through the wireless LAN I/F 60. If the Probe Response signal is received from the MFP 10, the CPU 72 determines to be YES in S126 and proceeds to S128. If the Probe Response signal is not received from the MFP 10, the CPU 72 determines to be NO in S126 and returns to S124.

In S128, the CPU 72 executes communication of the respective signals (for example, the transmission of the Authentication Request signal, and the like). In the process of communication of the respective signals, the CPU 72 further transmits the respective information (authentication system, encryption system, password, and the like) included in the wireless setting (MFP=G/O) in the memory 74 to the MFP 10. As a result, the MFP 10 determines that authentication is successful (S52 of FIG. 2).

If S128 is executed, connection is established between the MFP 10 and the CD 50. Accordingly, the CD 50 can participate in the WFDNW (MFP=G/O) as a legacy apparatus. In S128, the CPU 72 further receives the IP address of the MFP 10 and the IP address of the CD 50, which would be used in the WFDNW (MFP=G/O), from the MFP 10 through the wireless LAN I/F 60.

As described above, in S128, the CD 50 participates in the WFDNW (MFP=G/O) as a legacy apparatus. However, in a modified illustrative embodiment, the CPU 72 may execute communication of WFD connection data with the MFP 10 and may participate in the WFDNW (MFP=G/O) as a CL apparatus.

Next, in S130, the CPU 72 transmits the FAX data (that is, the FAX data received in S120) to the MFP 10 through the wireless LAN I/F 60. Specifically, the CPU 72 designates the received IP address of the CD 50 as a transmission source IP address, further designates the received IP address of the MFP 10 as a transmission destination IP address, and transmits the FAX data. Accordingly, the CPU 72 can transmit the FAX data to the MFP 10 using the WFDNW (MFP=G/O) without passing through other apparatuses. As a result, the MFP 10 prints an image represented by the FAX data (S56 of FIG. 2).

If the transmission of the FAX data from the CD 50 to the MFP 10 is completed, the process proceeds to S132. In S132, the CPU 72 transmits a Disassociation signal to the MFP 10 through the wireless LAN I/F 60. Accordingly, the CPU 72 disconnects the connection with the MFP 10. That is, the CD 50 can be diassociated from the WFDNW (MFP=G/O).

Next, in S134, the CPU 72 returns the state of the CD 50 to the G/O state and re-forms the WFDNW (CD=G/O). The CPU 72 generates a management list in the memory 74. The wireless setting (CD=G/O) which is used in the re-formed WFDNW (CD=G/O) is the same as the wireless setting (CD=G/O) which is used in the WFDNW (CD=G/O) formed in S110. If S134 ends, the process returns to S120.

Subsequently, a condition where it is determined to be YES in the monitoring processing of S150 will be described. As described, when the FAX data is transmitted to the CD 50, the MFP 10 transmits the Probe Request signal including the SSID (CD=G/O) (S24 of FIG. 2).

If the Probe Request signal including the SSID (CD=G/O) is received from the MFP 10 through the wireless LAN I/F 60, the CPU 72 of the CD 50 determines to be YES in S150 and proceeds to S152. The Probe Request signal further includes the MAC address of the MFP 10. S152 is similar to S52 of FIG. 2, except that the execution entity is the CPU 72 and information to be used is different. Accordingly, hereinafter, the details of S152 will be described without describing the same point as S52 of FIG. 2.

In S152, the CPU 72 executes communication of the respective signals (for example, the transmission of the Probe Response signal, the reception of the Authentication signal, and the like). In the process of communication of the respective signals, the CPU 72 further receives the respective information (authentication system, encryption system, password, and the like) included in the wireless setting (CD=G/O) from the MFP 10. If the wireless setting (CD=G/O) is received from the MFP 10, the CPU 72 executes the authentication of the MFP 10 and determines that authentication is successful. The CPU 72 describes the MAC address of the MFP 10 in the management list in the memory 74.

If S152 is executed, connection is established between the MFP 10 and the CD 50. Accordingly, the MFP 10 can participate in the WFDNW (CD=G/O) as a legacy apparatus. That is, the CPU 72 can cause the MFP 10 to participate in the WFDNW (CD=G/O) as a legacy apparatus. In S152, the CPU 72 further transmits the IP address of the MFP 10 and the IP address of the CD 50, which would be used in the WFDNW (CD=G/O), to the MFP 10 through the wireless LAN I/F 60.

Next, in S154, the CPU 72 receives the FAX data and the FAX number from the MFP 10 through the wireless LAN I/F 60.

Subsequently, in S156, the CPU 72 makes a call to the received FAX number (hereinafter, regarded as the FAX number of the FAX machine 110) through the PSTN I/F 62. Accordingly, connection for FAX communication is established between the CD 50 and the FAX machine 110. Next, the CPU 72 transmits FAX data (that is, the FAX data received in S154) to the FAX machine 110 through the PSTN I/F 62 (that is, through the PSTN).

Next, in S158, the CPU 72 receives a Disassociation signal from the MFP 10 through the wireless LAN I/F 60 (S34 of FIG. 2). Accordingly, the CPU 72 disconnects the connection with the MFP 10. The CPU 72 deletes the MAC address of the MFP 10 from the management list in the memory 74. As a result, the MFP 10 is diassociated from the WFDNW (CD=G/O). If S158 ends, the process returns to S120.

(Specific Cases)

Subsequently, specific cases which are performed by the respective processing of FIGS. 2 and 3 will be described while referring to FIGS. 4 and 5.

(Case of FAX Transmission; FIG. 4)

If the MFP 10 is powered on, the MFP 10 sets the state of the MFP 10 in the G/O state and forms the WFDNW (MFP=G/O) (S10 of FIG. 2). In this stage, there is no CL apparatus which belongs to the WFDNW (MFP=G/O). The SSID (MFP=G/O) which is used in the WFDNW (MFP=G/O) is "X1".

Figure 3:
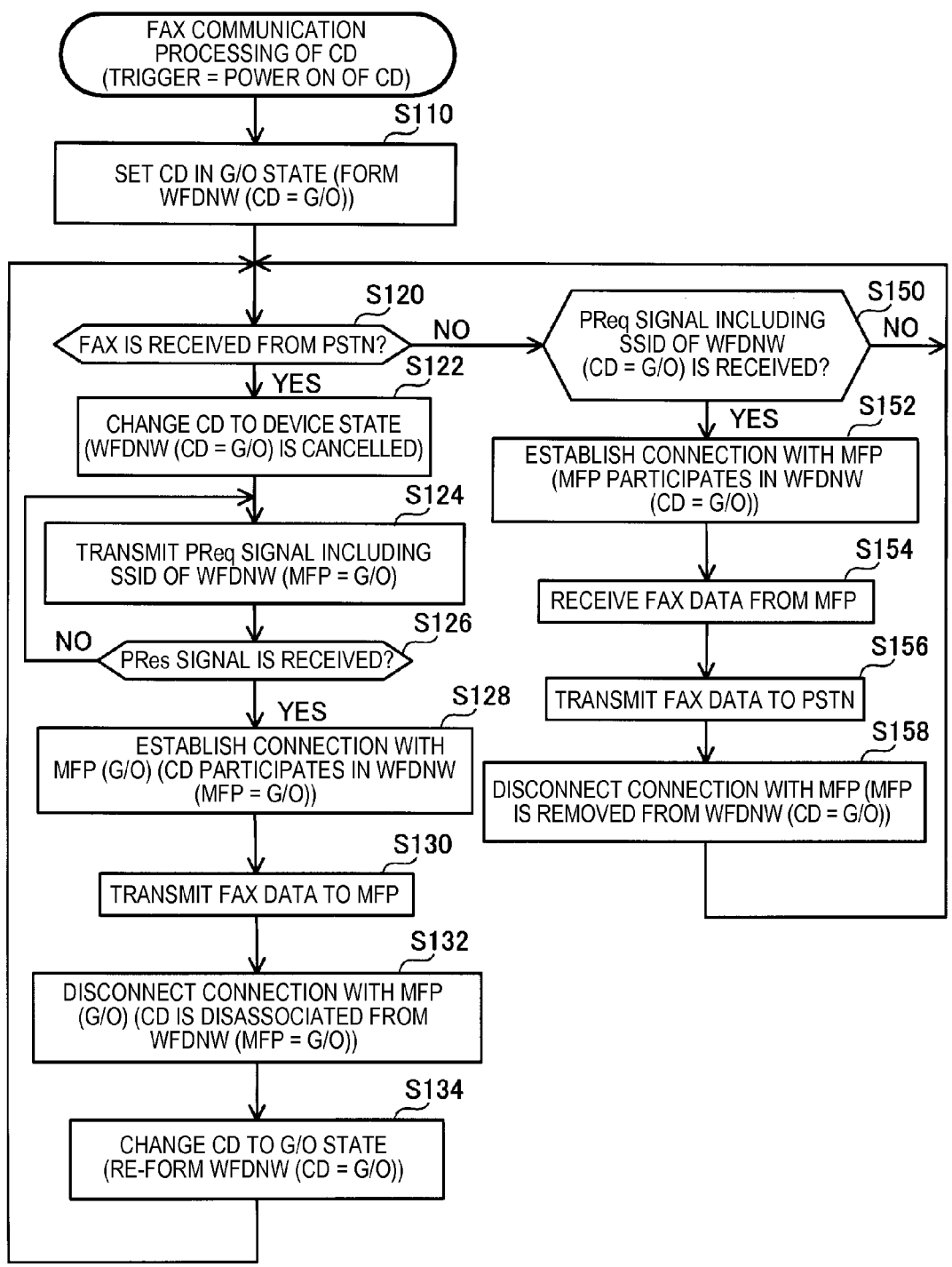
FIG. 3 is a flowchart of FAX communication processing of a call device (CD)

If the CD 50 is powered on, the CPU 72 sets the state of the CD 50 in the G/O state and forms the WFDNW (CD=G/O) (S110 of FIG. 3). In this stage, there is no CL apparatus which belongs to the WFDNW (CD=G/O). The SSID (MFP=G/O) which is used in the WFDNW (CD=G/O) is "X2".

If the user wants to cause the PC 100 to participate in the WFDNW (MFP=G/O) as a CL apparatus, the user executes predetermined operation on the PC 100 and further executes the WFD connection operation on the operation unit 12 of the MFP 10. In this case, although not shown in FIG. 2, the MFP 10 (that is, the CPU 32) executes communication of WFD connection data with the PC 100 through the wireless LAN I/F 20.

Specifically, the MFP 10 first receives the Probe Request signal from the PC 100 and transmits the Probe Response signal to the PC 100. The Probe Request signal includes the MAC address of the PC 100. Next, the MFP 10 executes communication of WFD connection data (for example, the reception of the Provision Discovery Request signal, the reception of the Authentication Request signal, and the like). In the process of communication of WFD connection data, the MFP 10 transmits the wireless setting (MFP=G/O) in the memory 34 to the PC 100. If communication of WFD connection data is executed, connection is established between the MFP 10 and the PC 100.

Next, the MFP 10 add the MAC address (that is, the MAC address included in the Probe Request signal transmitted from the PC 100 to the MFP 10) of the PC 100 in the management list in the memory 34. That is, the MFP 10 can cause the PC 100 to participate in the WFDNW (MFP=G/O) as a CL apparatus.

Since the MFP 10 and the PC 100 belong to the same WFDNW (MFP=G/O), for example, the PC 100 can transmit print data to the MFP 10 using the WFDNW (MFP=G/O) without passing through other apparatuses. Although not shown in FIG. 2, if print data is received from the PC 100, the MFP 10 prints an image represented by the received print data on a printing medium. In this case, according to this illustrative embodiment, since the MFP 10 can cause the PC 100 to participate in the WFDNW (MFP=G/O) as a CL apparatus, the MFP 10 can receive print data from the PC 100 and can execute printing.

Thereafter, if the user wants to transmit FAX data to the FAX machine 110, the user provides FAX transmission instruction (for example, inputs the FAX number of the FAX machine 110) to the MFP 10 (YES in S20 of FIG. 2). In this case, the MFP 10 is transited from the G/O state to the device state and cancels the WFDNW (MFP=G/O) (S22). As a result, the PC 100 is diassociated from the WFDNW (MFP=G/O) and is transited from the CL state to the device state.

Next, the MFP 10 transmits the Probe Request signal including the SSID "X2" of the wireless setting (CD=G/O) in the memory 34 to the CD 50 (S24 of FIG. 2). If the Probe Request signal including "X2" is received from the MFP 10 (YES in S150 of FIG. 3), the CD 50 transmits the Probe Response signal to the MFP 10 (S152).

Subsequently, the MFP 10 and the CD 50 execute wireless communication of normal Wi-Fi connection data and establish connection (S28 of FIG. 2 and S152 of FIG. 3). The CD 50 describes the MAC address of the MFP 10 in the management list in the memory 74. As a result, the MFP 10 participates in the WFDNW (CD=G/O) as a legacy apparatus.

Next, the MFP 10 scans an original and generates FAX data (S30 of FIG. 2). The MFP 10 transmits the FAX data and the FAX number to the CD 50 using the WFDNW (CD=G/O) (S32). If the FAX data is received from the MFP 10 (S154 of FIG. 3), the CD 50 transmits the FAX data to the FAX machine 110 through the PSTN.

Next, the MFP 10 transmits a Disassociation signal to the CD 50 (S34 of FIG. 2). Accordingly, the connection between the MFP 10 and the CD 50 is disconnected, and the MFP 10 is diassociated from the WFDNW (CD=G/O). Then, the CPU 32 returns the state of the MFP 10 to the G/O state and re-forms the WFDNW (MFP=G/O) (S36). Accordingly, thereafter, when the transmission of the FAX data from the CD 50 to the MFP 10 is executed (a case of FIG. 5 described below), the MFP 10 can cause the CD 50 to appropriately participate in the WFDNW (MFP=G/O), and as a result, can appropriately receive the FAX data from the CD 50.

If the Disassociation signal is received from the MFP 10, the CD 50 deletes the MAC address of the MFP 10 from the management list in the memory 74. As a result, while the number of MAC addresses in the management list becomes zero, the CD 50 is maintained in the G/O state and maintains the WFDNW (CD=G/O).

Figure 4:
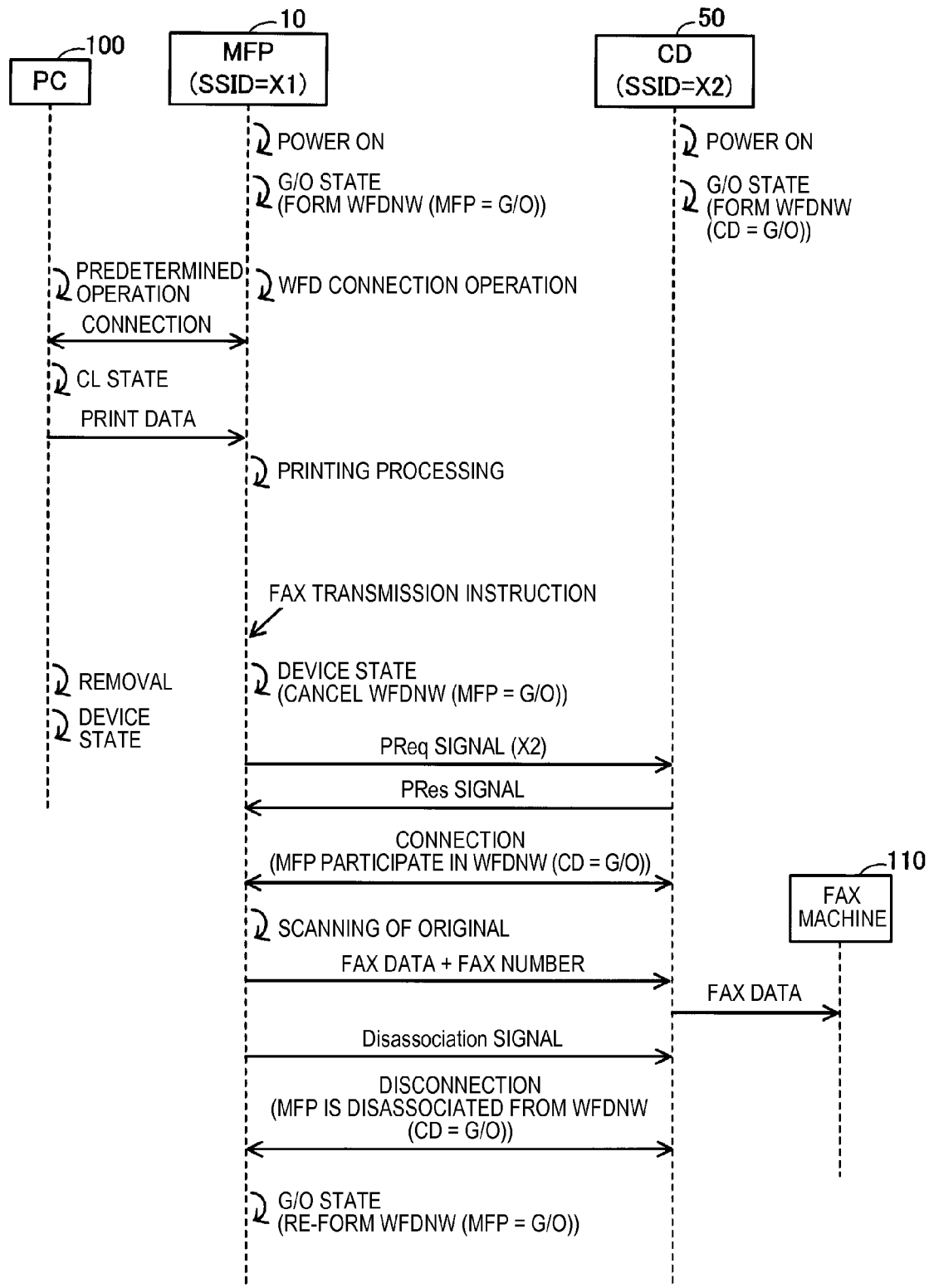
FIG. 4 is a sequence diagram showing an operation of FAX transmission of an MFP and a CD.

Although not shown in FIG. 4, if the user executes the above-described WFD connection operation on the MFP 10 again and executes the above-described predetermined operation on the PC 100 again, it is possible to cause the PC 100 to participate in the re-formed WFDNW (MFP=G/O) again.

As described above, since the PC 100 or the like may participate in the WFDNW (MFP=G/O), when FAX data is transmitted from the CD 50 to the MFP 10, there is a possibility that the number of CL apparatuses which participate in the WFDNW (MFP=G/O) reaches an upper limit value. Although not shown in FIG. 2, in a state where the number of CL apparatuses which participate in the WFDNW (MFP=G/O) reaches the upper limit value, if it is determined to be YES in S50 of FIG. 2 (hereinafter, referred to as "specific condition"), the MFP 10 (that is, the CPU 32) transmits a Disassociation signal to a specific CL apparatus (for example, the PC 100) so as to cause the specific CL apparatus to be diassociated from the WFDNW (MFP=G/O). Accordingly, since the number of CL apparatuses which belong to the WFDNW (MFP=G/O) becomes (the upper limit value—1), the MFP 10 can cause the CD 50 to appropriately participate in the WFDNW (MFP=G/O).

For example, if communication of print data is being executed between the MFP 10 and the specific CL apparatus (for example, the PC 100), before communication of print data is completed, the MFP 10 transmits a Disassociation signal to the specific CL apparatus. In this case, the MFP 10 can quickly disconnect the connection between the MFP 10 and the specific CL apparatus. As a result, the MFP 10 can cause the CD 50 to quickly participate in the WFDNW (MFP=G/O) and can quickly receive FAX data from the CD 50. However, in a modified illustrative embodiment, after communication of print data is completed, the MFP 10 may transmit the Disassociation signal to the specific CL apparatus. In this case, the MFP 10 can receive all print data from the specific CL apparatus and can appropriately execute printing.

In the above-described specific condition, if there are a plurality of CL apparatuses, the MFP 10 may select a CL apparatus of a transmission destination of the Disassociation signal in the following manner. That is, for each of a plurality of CL apparatuses, the MFP 10 stores communication date and time on which wireless communication with the CL apparatus is executed. The MFP 10 selects a CL apparatus having the oldest communication date and time out of the plurality of CL apparatuses as the CL apparatus of the transmission destination of the Disassociation signal. In a modified illustrative embodiment, in the above-described specific condition, if there are a plurality of CL apparatuses, the MFP 10 may transmit the Disassociation signal to all of the plurality of CL apparatuses and may cause all of the plurality of CL apparatuses to be diassociated from the WFDNW (MFP=G/O).

(Case of FAX Reception; FIG. 5)

Figure 5:
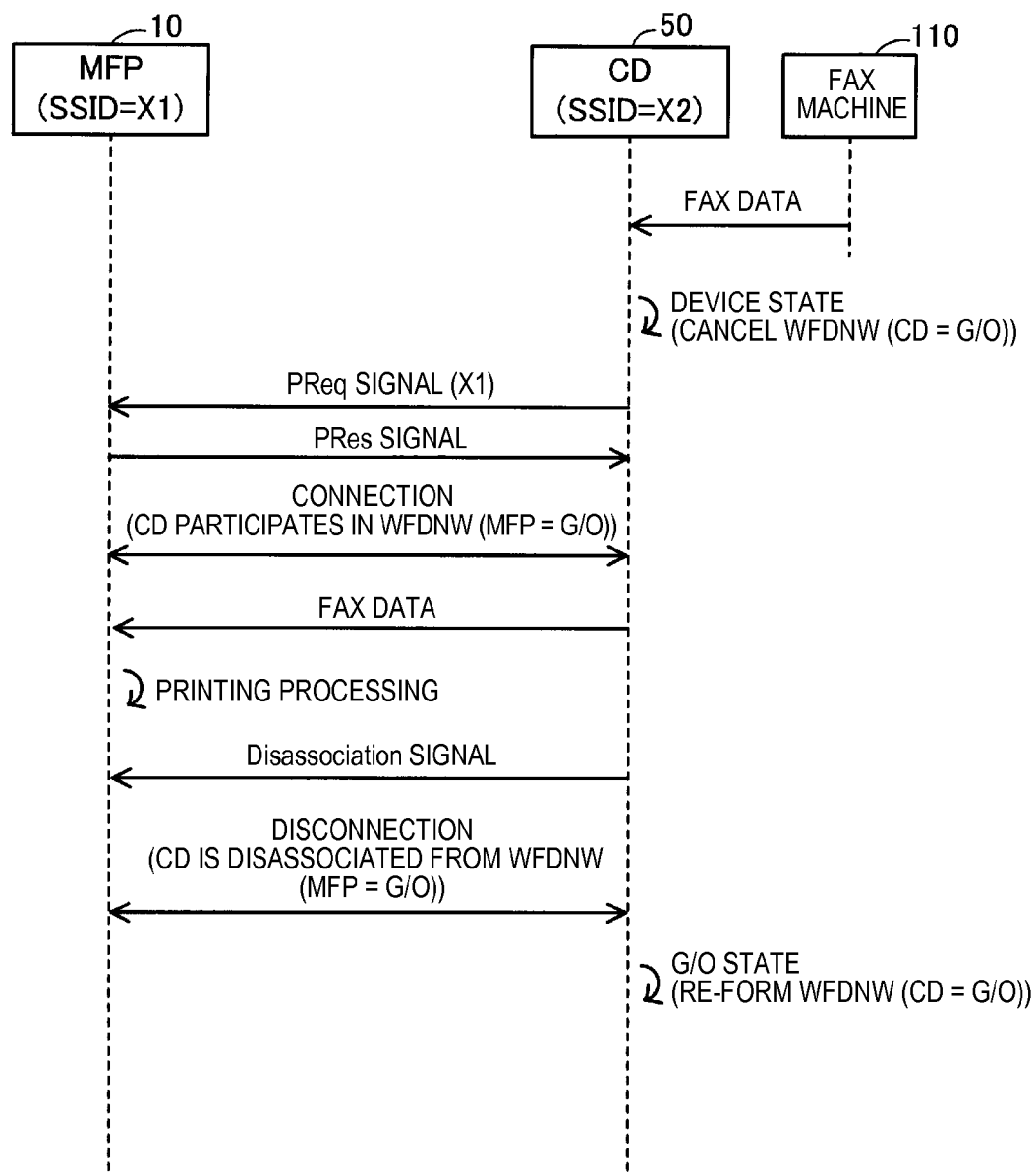
FIG. 5 is a sequence diagram showing an operation of FAX reception of an MFP and a CD.

Although not shown in FIG. 5, similarly to FIG. 4, both the MFP 10 and the CD 50 have been powered on. That is, the WFDNW (MFP=G/O) to which only the MFP 10 as a G/O apparatus belongs is formed, and the WFDNW (CD=G/O) to which only the CD 50 as a G/O apparatus belongs is formed.

If FAX data is received from the FAX machine 110 through the PSTN (YES in S120 of FIG. 3), the CD 50 is transited from the G/O state to the device state and cancels the WFDNW (CD=G/O) (S122).

Next, the CD 50 transmits the Probe Request signal including the SSID "X1" of the wireless setting (MFP=G/O) in the memory 74 to the MFP 10 (S124 of FIG. 3). If the Probe Request signal including "X1" is received from the CD 50 (YES in S50 of FIG. 2), the MFP 10 transmits the Probe Response signal to the CD 50 (S52).

Subsequently, the MFP 10 and the CD 50 execute wireless communication of normal Wi-Fi connection data and establish connection (S52 of FIG. 2 and S128 of FIG. 3). The MFP 10 adds the MAC address of the CD 50 in the management list in the memory 34. As a result, the CD 50 participates in the WFDNW (MFP=G/O) as a legacy apparatus.

Next, the CD 50 transmits the FAX data to the MFP 10 using the WFDNW (MFP=G/O) (S130 of FIG. 3). If the FAX data is received from the CD 50 (S54 of FIG. 2), the MFP 10 prints an image represented by the FAX data on a printing medium (S56).

Next, the CD 50 transmits a Disassociation signal to the MFP 10 (S132 of FIG. 3), returns the state of the CD 50 to the G/O state, and re-forms the WFDNW (CD=G/O) (S134). Accordingly, thereafter, when the transmission of the FAX data from the MFP 10 to the CD 50 is executed (the case of FIG. 4), the CD 50 can cause the MFP 10 to appropriately participate in the WFDNW (CD=G/O), and as a result, can appropriately receive the FAX data from the MFP 10.

If the Disassociation signal is received from the CD 50, the MFP 10 deletes the MAC address of the CD 50 from the management list in the memory 34. As a result, while the number of the MAC addresses in the management list becomes zero, the MFP 10 is maintained in the G/O state and maintains the WFDNW (MFP=G/O).

Effects of First Illustrative Embodiment

In this illustrative embodiment, the MFP 10 and the CD 50 use the WFDNW so as to execute wireless communication of FAX data. Alternatively, it might be considered that wireless communication of FAX data is executed using an ad hoc system or an infrastructure system. However, in the ad hoc system, normally, a WEP (Wired Equivalent Privacy) encryption system having comparatively low security is used. Accordingly, in this illustrative embodiment, from the viewpoint of security, the ad hoc system is not employed.

Further, in the infrastructure system, the MFP 10 and the CD 50 can execute wireless communication of FAX data through an AP. In the infrastructure system, since an encryption system (for example, AES (Advanced Encryption Standard) or the like) other than WEP can be used, there is no problem about security. However, the user needs to set a wireless setting for connection with the AP in both the MFP 10 and the CD 50. There is a possibility that a user who has less knowledge of wireless communication sets an incorrect wireless setting in the MFP 10 and the like, and in this case, the MFP 10 and the CD 50 cannot execute wireless communication of FAX data. In consideration of this situation, in this illustrative embodiment, the infrastructure system is not employed.

In this illustrative embodiment, during a period other than a condition where FAX data is transmitted to the CD 50 (the case of FIG. 4), the MFP 10 operates in the G/O state and maintains the WFDNW (MFP=G/O). During a period other than a condition where FAX data is transmitted to the MFP 10 (the case of FIG. 5), the CD 50 operates in the G/O state and maintains the WFDNW (CD=G/O). The memory 34 of the MFP 10 and the memory 74 of the CD 50 respectively store the wireless setting (MFP=G/O) and the wireless setting (CD=G/O) in advance.

Accordingly, as shown in the case of FIG. 4, in a condition where both the WFDNW (MFP=G/O) and the WFDNW (CD=G/O) are formed, when FAX data is transmitted to the CD 50, the MFP 10 can participate in the WFDNW (CD=G/O) as a legacy apparatus using the wireless setting (CD=G/O) in the memory 34. As a result, the MFP 10 can appropriately transmit the FAX data to the CD 50 using the WFDNW (CD=G/O). Then, the CD 50 can appropriately receive the FAX data from the MFP 10 using the WFDNW (CD=G/O), and as a result, can appropriately transmit the FAX data to the FAX machine 110 through the PSTN.

As shown in the case of FIG. 5, in a condition where both the WFDNW (MFP=G/O) and the WFDNW (CD=G/O) are formed, when FAX data is transmitted to the MFP 10, the CD 50 can participate in the WFDNW (MFP=G/O) as a legacy apparatus using the wireless setting (MFP=G/O) in the memory 74. As a result, the CD 50 can appropriately transmit the FAX data to the MFP 10 using the WFDNW (MFP=G/O). Then, the MFP 10 can appropriately receive the FAX data from the CD 50 using the WFDNW (MFP=G/O), and as a result, can print an image represented by the FAX data.

In this illustrative embodiment, the wireless setting (MFP=G/O) and the wireless setting (CD=G/O) respectively include the AES encryption system. For this reason, it is possible to ensure comparatively high security. Since the wireless setting is stored in the respective memories 34 and 74 in advance, the user does not need to set a wireless setting in the MFP 10 and the CD 50. Accordingly, this illustrative embodiment is superior to a configuration where an ad hoc system or an infrastructure system is employed in the viewpoint of security and user convenience.

As described above, in this illustrative embodiment, during a period other than a condition where wireless communication of FAX data is executed, both the WFDNW (MFP=G/O) and the WFDNW (CD=G/O) are formed. Alternatively, it might be considered that only one WFDNW, in which one of the MFP 10 and the CD 50 is a G/O apparatus and the other is a CL apparatus, is normally formed (hereinafter, referred to as "configuration of comparative embodiment"). According to the configuration of the comparative embodiment, the MFP 10 and the CD 50 can execute wireless communication of FAX data using the WFDNW even without changing the states thereof. However, the configuration of the comparative embodiment may have a problem for the following situations.

For example, it is assumed the case where only the WFDNW (MFP=G/O), in which the MFP 10 is a G/O apparatus and the CD 50 is a CL apparatus, is normally formed. As described above, the upper limit value (that is, the upper limit value of the number of MAC addresses of apparatuses which can be registered in the management list in the memory 34) of the number of apparatuses which can be managed by the G/O apparatus (that is, the MFP 10) is determined by the G/O apparatus in advance. Accordingly, if the configuration of the comparative example is employed, since the CD 50 constantly participates in the WFDNW (MFP=G/O) as a CL apparatus, the number of other apparatuses which can participate in the WFDNW (MFP=G/O) constantly becomes (the upper limit value—1). For example, if the upper limit value is "1", since the number of other apparatuses which can participate in the WFDNW (MFP=G/O) becomes zero, for example, the PC 100 cannot participate in the WFDNW (MFP=G/O). That is, the MFP 10 cannot receive print data from the PC 100 and cannot execute printing.

Similarly, even in case where the WFDNW (CD=CL), in which the MFP 10 is a CL apparatus and the CD 50 is a G/O apparatus, is normally formed, the number of other apparatuses which can participate in the WFDNW (CD=G/O) constantly becomes (the upper limit value—1). Accordingly, if the configuration of the comparative embodiment is employed, the number of other apparatuses which can participate in the WFDNW constantly becomes smaller, for example, there is a higher possibility that other apparatuses, such as the PC 100, cannot execute wireless communication with the MFP 10.

In consideration of those situations, in this illustrative embodiment, both the WFDNW (MFP=G/O) and the WFDNW (CD=G/O) are formed. Accordingly, the number of other apparatuses which can participate in the WFDNW does not become smaller (the upper limit value—1) and maintain as the upper limit value. For this reason, compared to the configuration of the comparative embodiment, for example, other apparatuses, such as the PC 100, can appropriately participate in the WFDNW (MFP=G/O). As a result, the MFP 10 can appropriately execute wireless communication with other apparatuses using the WFDNW (MFP=G/O).

(Correspondence)

In the case of FIG. 4, the following correspondence is obtained. The MFP 10, the CD 50, the PC 100, and the FAX machine 110 are respectively examples of "first wireless communication apparatus", "second wireless communication apparatus", "third wireless communication apparatus", and "external apparatus". The WFDNW (MFP=G/O) and the WFDNW (CD=G/O) are respectively examples of "first wireless network" and "second wireless network". A state where the MFP 10 is a G/O apparatus, a state where the MFP 10 participates in the WFDNW (CD=G/O) as a legacy apparatus, and a state where the CD 50 is a G/O apparatus are respectively examples of "first state", "second state", and "third state". A G/O apparatus is an example of "master station", and an apparatus which participates in the WFDNW (CD=G/O) as a legacy apparatus is an example of "slave station". The FAX transmission instruction, the FAX data, the PSTN, and the wireless setting (CD=G/O) are respectively examples of "predetermined instruction", "target data", "public communication network", and "wireless setting information".

Further, in the case of FIG. 5, the following correspondence is obtained. The CD 50, the MFP 10, and the FAX machine 110 are respectively examples of "first wireless communication apparatus", "second wireless communication apparatus", and "external apparatus". The WFDNW (CD=G/O) and the WFDNW (MFP=G/O) are respectively examples of "first wireless network" and "second wireless network". A state where the CD 50 is a G/O apparatus, a state where the CD 50 participates in the WFDNW (MFP=G/O) as a legacy apparatus, and a state where the MFP 10 is a G/O apparatus are respectively examples of "first state", "second state", and "third state". The wireless setting (MFP=G/O) is an example of "wireless setting information".

Second Illustrative Embodiment

A difference from the first illustrative embodiment will be described. In this illustrative embodiment, in a state where a CL apparatus participates in the WFDNW (MFP=G/O), if the WFDNW (MFP=G/O) is cancelled (S22 of FIG. 2), the MFP 10 can cause the CL apparatus to automatically participate again in the WFDNW (MFP=G/O) which will be re-formed.

In S22 of FIG. 2, the CPU 32 does not delete the management list from the memory 34. Accordingly, for example, if the PC 100 participates in the WFDNW (MFP=G/O) before the processing of S22 is executed, even in a stage in which the processing after S24 is executed, the MAC address of the PC 100 is described in the management list of the memory 34. However, in this stage, since there is no WFDNW (MFP=G/O), the PC 100 does not participate in the WFDNW (MFP=G/O).

After the processing of S36, the CPU 32 executes Invitation processing of S70 and returns to S20. As shown in FIG. 6, in S72, the CPU 32 determines whether one or more MAC addresses are described in the management list in the memory 34. If it is determined that one or more MAC addresses are described (YES in S72), the CPU 32 proceeds to S74. If it is determined that any MAC address is not described (NO in S72), the CPU 32 skips S74 to S84 and ends the Invitation processing.

In S74, the CPU 32 searches an apparatus in a device state of a WFD system. Specifically, the CPU 32 transmits the Probe Request signal including no SSID through the wireless LAN I/F 20. If there are one or more apparatuses in the device state around the MFP 10, and if the Probe Request signal is received from the MFP 10, each of one or more apparatuses transmit the Probe Response signal including the MAC address of the apparatus to the MFP 10. In this case, the CPU 32 receives the Probe Response signal through the wireless LAN I/F 20.

Although not shown in FIG. 6, if any Probe Response signal is not received, the CPU 32 skips S76, determines to be NO in S78, and proceeds to S80. Meanwhile, if one or more Probe Response signals are received, the CPU 32 proceeds to S76.

In S76, the CPU 32 compares one or more MAC addresses described in the management list in the memory 34 with the search result (that is, one or more MAC addresses included in the received one or more Probe Response signals). Then, the CPU 32 attempts to find the MAC address (hereinafter, referred to as "target MAC address") which is described in the management list and included in the received Probe Response signal.

Next, in S78, the CPU 32 determines whether there are one or more target MAC addresses. If there are one or more target MAC addresses (YES in S78), the CPU 32 proceeds to S82. If there is no target MAC address (NO in S78), the CPU 32 proceeds to S80.

In S80, the CPU 32 deletes all MAC addresses which are described in the management list in the memory 34. If S80 ends, the CPU 32 ends the Invitation processing.

In S82, the CPU 32 deletes the MAC address other than the target MAC address from the management list in the memory 34. In S82, for each of one or more target MAC addresses, the CPU 32 further transmits an Invitation signal including the MAC address through the wireless LAN I/F 20. That is, the CPU 32 transmits one or more Invitation signals using one or more target MAC addresses. An Invitation signal is a signal (that is, a command) which is defined in the standard of the WFD, and is a signal which causes an apparatus (that is, an apparatus to which a MAC address included in the Invitation signal is allocated) of a transmission destination of the Invitation signal to participate in the WFDNW (that is, in this illustrative embodiment, the re-formed WFDNW (MFP=G/O)) as a CL apparatus.

Hereinafter, the apparatus (for example, the PC 100) of the transmission destination of the Invitation signal is referred to as "target apparatus". If the target apparatus includes a program for responding to the Invitation signal, and if the Invitation signal is received from the MFP 10, communication of WFD connection data (for example, the transmission of the Authentication Request signal, and the like) is executed with the MFP 10.

In S84, the CPU 32 executes communication of WFD connection data (that is, the reception of the Authentication Request signal, and the like) with the target apparatus through the wireless LAN I/F 20 and establishes the connection with the target apparatus. In the process of communication of connection data, the CPU 32 transmits the wireless setting (MFP=G/O) in the memory 34 to the target apparatus. If communication of WFD connection data is executed, the connection between the MFP 10 and the target apparatus (for example, the PC 100) is established. Accordingly, the MFP 10 can cause the target apparatus, which participated in the WFDNW (MFP=G/O) cancelled in S22 of FIG. 2, to participate again in the WFDNW (MFP=G/O) re-formed in S36 of FIG. 2 as a CL apparatus.

(Case of FAX Transmission; FIG. 7)

Subsequently, a specific case of this illustrative embodiment will be described referring to FIG. 7. The MAC address of the PC 100 is "M1". Before the transmission of FAX data from the MFP 10 to the CD 50 is executed, the PC 100 participates in the WFDNW (MFP=G/O). Accordingly, the MAC address "M1" of the PC 100 is described in the management list in the memory 34 of the MFP 10. In the case of FIG. 7, respective processing from when a FAX transmission instruction is provided to the MFP 10 until the WFDNW (MFP=G/O) is re-formed through communication of the FAX data is same as in FIG. 4.

If the WFDNW (MFP=G/O) is re-formed, the MFP 10 executes the Invitation processing in S70 of FIG. 2 and causes the PC 100, which participated in the cancelled WFDNW (MFP=G/O), to again participate in the re-formed WFDNW (MFP=G/O). Specifically, the MFP 10 transmits the Probe Request signal and searches an apparatus (that is, the PC 100) in a device state (S74 of FIG. 6). Accordingly, the MFP 10 receives the Probe Response signal including the MAC address "M1" from the PC 100.

As described above, the MAC address "M1" is described in the management list in the memory 34. Accordingly, the MFP 10 determines that the MAC address "M1" described in the management list coincides with the MAC address "M1" included in the Probe Response signal (YES in S78). That is, the MAC address "M1" is determined as a target MAC address.

Next, the MFP 10 transmits the Invitation signal including the MAC address "M1" to the PC 100 (S82). The MFP 10 executes communication of WFD connection data with the PC 100 and establishes the connection with the PC 100 (S84). Accordingly, the MFP 10 can cause the PC 100 to again participate in the re-formed WFDNW (MFP=G/O) as a CL apparatus. That is, even if WFD connection operation is not executed, the MFP 10 can cause the PC 100 to automatically participate in the re-formed WFDNW (MFP=G/O) again.

(Correspondence)

In the case of FIG. 7, the MFP 10, the CD 50, and the PC 100 are respectively examples of "first wireless communication apparatus", "second wireless communication apparatus", and "third wireless communication apparatus". The MAC address "M1" of the PC 100 and the Invitation signal are respectively examples of "identification information" and "specific command".

While the present invention has been shown and described with reference to certain illustrative embodiments thereof, it will be understood by those skilled in the art that various changes in form and details may be made therein without departing from the spirit and scope of the invention as defined by the appended claims.

Modified Illustrative Embodiment 1

In the above-described illustrative embodiments, in S10 and S36 of FIG. 2, the CPU 32 of the MFP 10 sets the state of the MFP 10 in the G/O state of the WFD system and forms the WFDNW (MFP=G/O). Alternatively, in S10 and S36 of FIG. 2, the CPU 32 may start so-called SoftAP to form a wireless network (hereinafter, referred to as "first normal Wi-FiNW") of a normal Wi-Fi system in which the MFP 10 operates as an AP. Similarly, in S110 and S134 of FIG. 3, the CPU 72 of the CD 50 may start SoftAP to form a wireless network (hereinafter, referred to as "second normal Wi-FiNW") of a normal Wi-Fi system in which the CD 50 operates as an AP.

The memory 34 of the MFP 10 and the memory 74 of the CD 50 may respectively store a wireless setting to be used in the first normal Wi-FiNW and a wireless setting to be used in the second normal Wi-FiNW. In this case, the CPU 32 of the MFP 10 stops SoftAP in S22 of FIG. 2, transmits a Probe Request signal including the SSID of the wireless setting to be used in the second normal Wi-FiNW in S24, and participates in the second normal Wi-FiNW as a legacy apparatus in S28. Similarly, the CPU 72 of the CD 50 stops SoftAP in S122 of FIG. 3, transmits the Probe Request signal including the SSID of the wireless setting to be used in the first normal Wi-FiNW in S124, and participates in the first normal Wi-FiNW as a legacy apparatus in S128.

In this modified illustrative embodiment, the MFP 10 and the CD 50 can appropriately execute wireless communication of FAX data using the first normal Wi-FiNW or the second normal Wi-FiNW. In this illustrative embodiment, the first normal Wi-FiNW and the second normal Wi-FiNW are respectively examples of "first wireless network" and "second wireless network". An apparatus which starts SoftAP and an apparatus which participates in a normal Wi-FiNW as a legacy apparatus are respectively examples of "master station" and "slave station".

Modified Illustrative Embodiment 2

In the above-described illustrative embodiments, the CD 50 and the FAX machine 110 execute communication of FAX data through the PSTN. Alternatively, the CD 50 and the FAX machine 110 may execute communication of FAX data through Internet. In this modified illustrative embodiment, when inputting the FAX transmission instruction to the MFP 10, the user designates the address (for example, the E-mail address) of the FAX machine 110, instead of the FAX number. In S32 in FIG. 2, the CPU 32 of the MFP 10 transmits the FAX data and the designated address to the CD 50. In S156 of FIG. 3, the CD 50 transmits the FAX data with the designated address as a transmission destination. In this modified illustrative embodiment, the CD 50 can transmit the FAX data to the FAX machine 110. In general, "external apparatus" may be an apparatus which is connected to the public communication network as in the above-described illustrative embodiments, or may be apparatus which is not connected to the public communication network as in this modified illustrative embodiment.

Modified Illustrative Embodiment 3

In the above-described illustrative embodiments, the target data which is a communication target to be communicated between the MFP 10 and the CD 50 is the FAX data. Alternatively, the following configuration may be employed. For example, in the above-described illustrative embodiments, although the handset 80 is provided in the CD 50, the handset 80 may be provided in the MFP 10. In this case, since the CD 50 does not include the handset 80, the CD 50 cannot be a call device. Accordingly, hereinafter, the CD 50 which does not include the handset is referred to as "relay apparatus (that is, a relay apparatus including the PSTN I/F 62)". The MFP 10 transmits voice data input to the microphone 82 of the handset 80 to the relay apparatus, and the relay apparatus transmits voice data received from the MFP 10 to the PSTN. The relay apparatus transmits voice data received from the PSTN to the MFP 10, and the MFP 10 outputs voice data received from the relay apparatus through the speaker of the handset 80. In this modified illustrative embodiment, the MFP 10, the relay apparatus, and voice data are respectively examples of "first wireless communication apparatus", "second wireless communication apparatus", and "target data".

Modified Illustrative Embodiment 4

A "first wireless communication apparatus" and a "second wireless communication apparatus" are not limited to the MFP 10 and the CD 50, and may be other apparatuses (printer, scanner, copy machine, portable terminal, PC, server, and the like). Target data which is communicated between the "first wireless communication apparatus" and the "second wireless communication apparatus" is not limited to FAX data or voice data, and may be a document file, an image file, or the like.

Modified Illustrative Embodiment 5

In the above-described illustrative embodiments, the CPU 32 of the MFP 10 executes the program (that is, software) in the memory 34, whereby the respective processing of FIG. 2 is performed. The CPU 72 of the CD 50 executes the program (that is, software) in the memory 74, whereby the respective processing of FIG. 3 is performed. Alternatively, at least one kind of processing out of the respective processing of FIGS. 2 and 3 may be realized by hardware, such as a logic circuit.

The technical elements described in this specification or the drawings exhibit technical utility alone or in various combinations and are not limited to the combinations described in the claims as filed. The techniques illustrated in this specification or the drawings are intended to attain a plurality of purposes at a time, and have technical utility by attaining one of the purposes.

What is claimed is:

1. A wireless communication system comprising:
a first wireless communication apparatus; and
a second wireless communication apparatus, wherein the first wireless communication apparatus comprises:
a first control device configured to:
where a first wireless network in which the first wireless communication apparatus is a master station and a second wireless network in which the second wireless communication apparatus is a master station are formed, change a state of the first wireless communication apparatus from a first state to a second state in a specific case where transmission of target data is to be executed from the first wireless communication apparatus to the second wireless communication apparatus, the first state being a state in which the first wireless communication apparatus is the master station of the first wireless network, the second state being a state in which the first wireless communication apparatus is a slave station of the second wireless network, and in the specific case, transmit the target data to the second wireless communication apparatus using the second wireless network in which the first wireless communication apparatus is the slave station and the second wireless communication apparatus is the master station, and wherein the second wireless communication apparatus comprises: a second control device configured to:
in the specific case, receive the target data from the first wireless communication apparatus using the second wireless network in which the first wireless communication apparatus is the slave station and the second wireless communication apparatus is the master station.

2. The wireless communication system according to claim 1,
wherein the specific case includes a case where a predetermined instruction to transmit the target data to an external apparatus different from the first and second wireless communication apparatuses is provided to the first wireless communication apparatus, and
wherein the second control device of the second wireless communication apparatus is further configured to transmit the target data received from the first wireless communication apparatus to the external apparatus.

3. The wireless communication system according to claim 2,
wherein the first wireless communication apparatus further comprises a scanning execution unit,
wherein the first control device of the first wireless communication apparatus is further configured to:
control the scanning execution unit to scan an original in the specific case; and
transmit the target data obtained by scanning the original to the second wireless communication apparatus, and
wherein the second control device of the second wireless communication apparatus is configured to transmit the target data received from the first wireless communication apparatus to the external apparatus via a public communication network.

4. The wireless communication system according to claim 1,
wherein the first control device of the first wireless communication apparatus is further configured to receive the target data from an external apparatus different from the first and second wireless communication apparatuses,
wherein the specific case includes a case where the target data is received from the external apparatus, and
wherein the first control device of the first wireless communication apparatus is further configured to transmit the target data received from the external apparatus to the second wireless communication apparatus in the specific case.

5. The wireless communication system according to claim 4,
wherein the first control device of the first wireless communication apparatus is further configured to receive the target data from the external apparatus via a public communication network,
wherein the second wireless communication apparatus further comprises:
a printing execution unit, and
wherein the second control device of the second wireless communication apparatus is further configured to control the printing execution unit to print an image represented by the target data received from the first wireless communication apparatus.

6. The wireless communication system according to claim 1,
wherein the first wireless communication apparatus further comprises:
a storage memory configured to store wireless setting information used in the second wireless network, and
wherein the first control device of the first wireless communication apparatus is configured to, in the specific case, control the first wireless communication apparatus to participate in the second wireless network using the wireless setting information in the storage memory so as to change the state of the first wireless communication apparatus from the first state to the second state.

7. The wireless communication system according to claim 1,
wherein the first control device of the first wireless communication apparatus is further configured to, after the transmission of the target data to the second wireless communication apparatus is completed, return the state of the first wireless communication apparatus from the second state to the first state so as to re-form the first wireless network.

8. The wireless communication system according to claim 1,
wherein the first control device of the first wireless communication apparatus is further configured to, before changing the state of the first wireless communication apparatus from the first state to the second state, control a third wireless communication apparatus different from the first and second wireless communication apparatuses to participate in the first wireless network as a slave station.

9. The wireless communication system according to claim 8, wherein the first control device of the first communication apparatus is further configured to:
acquire identification information of the third wireless communication apparatus from the third wireless communication apparatus in a case where the third wireless communication apparatus participates in the first wireless network;
change the state of the first wireless communication apparatus from the first state to the second state;
after the transmission of the target data to the second wireless communication apparatus is completed, return the state of the first wireless communication apparatus from the second state to the first state to re-form the first wireless network; and
after re-forming the first wireless network, transmit a specific command including the identification information of the third wireless communication apparatus to the third wireless communication apparatus, which has been disassociated from the first wireless network due to change of the state of the first wireless communication apparatus from the first state to the second state, so as to cause the third wireless communication apparatus to again participate in the first wireless network as a slave station.

10. The wireless communication system according to claim 1,
wherein the first control device of the first wireless communication apparatus is further configured to, in a case where the first wireless communication apparatus is powered on, set the state of the first wireless communication apparatus in the first state, and
wherein the second control device of the second wireless communication apparatus is further configured to, in a case where the second wireless communication apparatus is powered on, set the state of the second wireless communication apparatus in a third state in which the second wireless communication apparatus is the master station of the second wireless network.

11. A first wireless communication apparatus comprising:
a control device configured to:
where a first wireless network in which the first wireless communication apparatus is a master station and a second wireless network in which a second wireless communication apparatus is a master station are formed, change a state of the first wireless communication apparatus from a first state to a second state in a specific case where transmission of target data is to be executed from the first wireless communication apparatus to the second wireless communication apparatus, the first state being a state in which the first wireless communication apparatus is the master station of the first wireless network, the second state being a state in which the first wireless communication apparatus is a slave station of the second wireless network, and in the specific case, transmit the target data to the second wireless communication apparatus using the second wireless network in which the first wireless communication apparatus is the slave station and the second wireless communication apparatus is the master station.

* * * * *